US012597691B2

(12) United States Patent
Bianchi

(10) Patent No.: US 12,597,691 B2
(45) Date of Patent: Apr. 7, 2026

(54) MULTI-SECTION DIRECTIONAL COUPLER, A METHOD FOR MANUFACTURING A MULTI-SECTION DIRECTIONAL COUPLER AND A METHOD FOR OPERATING A MULTI-SECTION DIRECTIONAL COUPLER

(71) Applicant: Advantest Corporation, Tokyo (JP)

(72) Inventor: Giovanni Bianchi, Ehningen (DE)

(73) Assignee: Advantest Corporation, Tokyo (JP)

( * ) Notice: Subject to any disclaimer, the term of this patent is extended or adjusted under 35 U.S.C. 154(b) by 461 days.

(21) Appl. No.: 18/193,612

(22) Filed: Mar. 30, 2023

(65) Prior Publication Data

US 2023/0238679 A1 Jul. 27, 2023

Related U.S. Application Data

(63) Continuation of application No. PCT/EP2021/067442, filed on Jun. 24, 2021.

(51) Int. Cl.
*H01P 5/18* (2006.01)

(52) U.S. Cl.
CPC ................ *H01P 5/185* (2013.01); *H01P 5/18* (2013.01); *H01P 5/184* (2013.01)

(58) Field of Classification Search
CPC ............. H01P 5/185; H01P 5/184; H01P 5/18
USPC .......................................... 333/109, 115, 116
See application file for complete search history.

(56) References Cited

U.S. PATENT DOCUMENTS 4,139,827 A 2/1979 Russell
6,392,503 B1 5/2002 Thornton
7,183,877 B2 2/2007 Juenemann et al.
2006/0044074 A1 * 3/2006 Chang ..................... H01P 5/187 333/116
2021/0235576 A1 * 7/2021 Nagai .................. H05K 1/0237

FOREIGN PATENT DOCUMENTS

CN 107317083 11/2017

OTHER PUBLICATIONS

Shimizu et al: "Coupled-Transmission-Line Directional Couplers," IRE Transactions on Microwave Theory and Techniques, IEEE, USA, vol. 6, No. 4, Oct. 1, 1958 (Oct. 1, 1958), pp. 403-410.

* cited by examiner

*Primary Examiner* — Rakesh B Patel
(74) *Attorney, Agent, or Firm* — Artegis Law Group, LLP

(57) ABSTRACT

The disclosure describes a multi-section directional coupler comprising: a plurality of conductive lines, each conductive line comprises a plurality of line sections; a plurality of coupled line sections, each coupled line section comprises a first line section of a first conductive line and a second line section of a second conductive line, the coupled line sections comprise different coupling strength values, the coupled line sections facilitate signal coupling; and at least one grounded conductive coupling reduction structure arranged adjacent to a selected coupled line section and operable to reduce a coupling value between a respective line section of the first conductive line and a respective line section of the second conductive line of the selected coupled line section. The selected coupled line section comprises a smaller coupling strength value than another one of the coupled line sections. Methods of manufacturing and operating the multi-section directional coupler are also provided.

35 Claims, 11 Drawing Sheets

| N | relative BW, $\Delta f / f_0$ | peak-peak ripple, dB |
|---|---|---|
| 1 | 1 | 2.79 |
| 1 | 1.4 | 6.5 |
| 2 | 1 | 0.46 |
| 2 | 1.4 | 2.42 |
| 3 | 1 | 0.08 |
| 3 | 1.4 | 0.83 |

Fig. 2B

MULTI-SECTION DIRECTIONAL COUPLER, A METHOD FOR MANUFACTURING A MULTI-SECTION DIRECTIONAL COUPLER AND A METHOD FOR OPERATING A MULTI-SECTION DIRECTIONAL COUPLER

CROSS-REFERENCE TO RELATED APPLICATION

This application is a continuation of copending International Application No. PCT/EP2021/067442, filed Jun. 24, 2021, which is incorporated herein by reference in its entirety.

TECHNICAL FIELD

Embodiments according to the present application are concerned with improving directivity of couplers, such as multi-section directional couplers, for example by mitigating unwanted parasitic coupling between coupled lines of coupled line sections.

Embodiments according to the disclosure are related to a multi-section directional coupler.

Further embodiments according to the disclosure are related to a method for manufacturing a multi-section directional coupler.

Further embodiments according to the disclosure are related to a method for operating a multi-section directional coupler.

According to an aspect, embodiments according to the disclosure can be applied to provide an improved directivity and corresponding performance of a multi-section directional coupler.

Embodiments according to the disclosure can be applied to improve the accuracy of reflection coefficient measurements due to decreasing degradation factors, e.g., improving a directivity of a multi-section directional coupler. Embodiments can, for example, be applied in parallel-line couplers having a TEM structure, a non-TEM structure or a quasi-TEM structure, or to a microstrip directional coupler, or to a stripline directional coupler.

BACKGROUND

A multitude of applications of multi-section directional couplers, as well as different arrangements of couplers are currently known.

The directional couplers may have symmetric or asymmetric arrangement, e.g., as shown in FIGS. 1A and 1B.

FIG. 1A shows an asymmetrical coupler 100, which comprises N line sections. The sections are characterized by electrical lengths $\theta_{1 \ldots N}$ and by an even mode impedance $Z_{0e1 \ldots N}$ and an odd mode impedance $Z_{0o1 \ldots N}$. The number of line sections N could be even or odd. The coupling factor may increase or decrease with the position of the line section, e.g., $C_1<C_2< \ldots C_N$ or e.g., $C_1>C_2> \ldots C_N$.

FIG. 1B shows a symmetrical coupler 110, which comprises N line sections. The sections are characterized by electrical lengths $\theta_{1,2,3 \ldots N-2,N-1,N}$ and by an even mode impedance $Z_{0e1,2,3 \ldots N-2,N-1,N}$ and an odd mode impedance $Z_{0o1,2,3 \ldots N-2,N-1,N}$. The even mode impedance is, for example, defined as $Z_{0eh}=Z_{0eN+1-h}$; and the odd mode impedance is, for example, defined as $Z_{0oh}=Z_{0oN+1-h}$; where h=(1, . . . N−1)/2. The number of line sections N is, for example, odd. The coupling factor may, for example, increase with the position of the line section from the external to the center, e.g., $C_1=C_N<C_2=C_{N-1}< \ldots C_{(N+1)/2}$.

The line sections are, for example, impedance-matched: $\sqrt{Z_{0ek} \cdot Z_{0ok}}=R_0$ (e.g., within a tolerance of +/−5% or +/−10% or +/−20%), where $R_0$ is a reference impedance. The electrical length of the line sections is, for example, defined as $$\theta_k = \frac{\pi}{2}$$

(e.g., within a tolerance of +/−5% or +/−10% or +/−20%); wherein k=1, . . . N. Design of conventional multi-section directional couplers, both symmetrical and asymmetrical couplers, may, for example, be defined by the following design equations and correspondences. $Z_{0e}$ and $Z_{0o}$ are reference even and odd mode impedances.

For all the line sections of the coupler [k=1 to N] or k=1 . . . N, the following correspondences are correct.

The line sections are, for example, impedance-matched (e.g., within a tolerance of +/−5% or +/−10% or +/−20%):

$$\sqrt{Z_{0ek} \cdot Z_{0ok}}=R_0; \tag{1}$$

where $R_0$ is a reference impedance, which is usually (but not necessarily) equal to 50Ω.

The line sections have, for example, the same electrical length equal to 90° at the center frequency $f_0$ (e.g., within a tolerance of +/−5% or +/−10% or +/−20%):

$$\theta_k = \frac{\pi}{2}. \tag{2}$$

The line sections have, for example, a specific coupling factor C:

$$C_k = \frac{Z_{0ek} - Z_{0ok}}{Z_{0ek} + Z_{0ok}} = \frac{\frac{Z_{0ek}}{Z_{0ok}} - 1}{\frac{Z_{0ek}}{Z_{0ok}} + 1} = \frac{\left(\frac{Z_{0ek}}{R_0}\right)^2 - 1}{\left(\frac{Z_{0ek}}{R_0}\right)^2 + 1}. \tag{3}$$

A directional coupler is, for example, a reciprocal and a symmetrical network.

A reciprocal network is one in which the transmission of a signal between any two ports does not depend on the direction of propagation, input and output ports are interchangeable. Scattering parameters for the reciprocal network are, for example, defined as $s_{hk}=s_{kh}$, where h,k=1 to 4, h≠k.

A network is symmetrical if its input impedance is equal to its output impedance. Scattering parameters for the symmetrical network are defined as $s_{12}=s_{34}$, $s_{13}=s_{24}$, $s_{23}=s_{14}$.

If the matching condition (1) is satisfied for the directional coupler then:

all the ports of the coupler have no reflection; the scattering parameters:

$$s_{11}=s_{22}=s_{33}=s_{44}=0;$$

the ports 1-4 and 2-3 are isolated: $s_{14}=s_{23}=0$;

therefore, it is also correct that $|s_{12}|^2=1-|s_{31}|^2$.

It should be noted that imperfections may naturally occur in view of the tolerances.

In case the proper dependency is followed for the values of the coupling factor $C_k$, which is obtained by circuit synthesis techniques, the global coupling factor $s_{31}$ is dependent on a frequency bandwidth across the center frequency $f_0$.

FIG. 2A shows some examples of possible coupling curves with different number of sections and relative bandwidth ($\Delta f/f_0$). All the curves are plotted against the normalized frequency ($f/f_0$).

FIG. 2B shows a table, illustrating an in-band ripple, e.g., Peak-Peak Ripple, for different number of sections and relative bandwidth ($\Delta f/f_0$). For a given number of sections N, the wider the relative bandwidth the higher the in-band ripple (max-min) of the global coupling function $20\cdot\log_{10}(|s_{31}|)$. For a given relative bandwidth, the higher the section number N, the lower the in-band ripple.

The performance of directional couplers may be estimated by several performance parameters: return-loss, nominal coupling value, insertion-loss, isolation and directivity. A return-loss parameter shows an isolation of the directional coupler. The return-loss at the different ports of the directional coupler is defined as: $-20\cdot\log_{10}(|s_{11}|)$, $-20\cdot\log_{10}(|s_{22}|)$, $-20\cdot\log_{10}(|s_{33}|)$, $-\mathbf{20}\cdot\log_{10}(|s_{44}|)$. In the ideal case the return-loss is infinite. In the worst case, e.g., when the highest value over the frequency bandwidth, the return-loss is considered or specified.

A nominal coupling value is an arithmetical average between the minimum and maximum value, across the specified frequency bandwidth, of $-20\cdot\log_{10}(|s_{13}|)$, $-20\cdot\log_{10}(s_{24}|)$: the two functions are identical in the ideal case, and not identical in the real case.

An insertion-loss parameter is defined as $-20\cdot\log_{10}(|s_{12}|)$, $-20\log_{10}(|s_{34}|)$. It is always worse in reality than in the ideal case.

An isolation is, in the worst case, e.g., where the highest value over the specified frequency bandwidth, of $-20\cdot\log_{10}(|s_{14}|)$, $-\mathbf{20}\cdot\log_{10}(|s_{23}|)$. The isolation parameter is infinite in the ideal case.

A directivity is defined as $20\cdot\log_{10}(|s_{13}/s_{14}|)$, $20\cdot\log_{10}(|s_{24}/s_{23}|)$. It is infinite in the ideal case. The directivity is the most significant parameter in the most application cases.

FIG. 3 shows a conventional directional coupler 300, e.g., a double-section microstrip direction coupler, where the section number N=2 and the center frequency $f_0$=40 GHz. The size is 2.1×1.2 mm.

One important application of the directional coupler 300, as the one shown in FIG. 3, is a reflection coefficient measurement. If a generator is connected with port P1 of the coupler, one load with port P2, one matched termination ($\Gamma$=0), then the received signal is proportional to the reflection coefficient ($\Gamma=\Gamma_{LOAD,P3}$) on port P2, via the global coupling function $s_{43}$. The accuracy of that function is compromised if there is signal transmission from port P1 to port P4: the relevant parameter is the directivity. Many applications of the directional coupler may be reduced to this case.

There are some non-ideality factors, e.g., degradation factors, which may negatively influence on the directivity of the directional coupler and decrease its performance upon measuring corresponding reflection coefficients.

If the transmission-line structure used in the coupler is not truly Transverse Electro-Magnetic (TEM), then the even and odd mode have different propagation speed. This prevents the exact fulfillment of the condition (2), in that there are two different electrical lengths (even-mode and odd-mode) instead of one, as in the purely TEM-case. One important case of non-TEM or quasi-TEM is the microstrip or—more general—all transmission lines with non-homogeneous dielectric.

Irrespective of the type and arrangement of the multi-section directional coupler, particularly irrespective of whether the transmission-line structure is TEM or not, there may be unwanted coupling between the conductive lines at their junctions with the coupled line sections, so called "true part" of the coupler.

Each section of the circuits shown in FIGS. 1A and 1B has different width and spacing from the closest one, this involves a step in the junction and/or an unwanted parasitic coupling section between the wanted coupling sections. The result is somehow equivalent to a perturbation on the fulfillment of conditions (1), (2), and (3).

FIG. 4 illustrates degradation factors of a conventional directional coupler 400, such as the directional coupler 300 shown in FIG. 3. The directional coupler 400 comprises a first coupling section 401 characterized by parameters: a first electrical length $\theta_1=\pi/2$ and first even and odd mode impedances $Z_{0e1}$ and $Z_{0o1}$. The directional coupler comprises a second coupling section 402 characterized by parameters: a second electrical length $\theta_2=\pi/2$ and second even and odd mode impedances $Z_{0e2}$ and $Z_{0o2}$. An unwanted parasitic coupling section 403 having the length $l_x$ appears between the first and the second coupling sections. Small length $l_x$ means shorter unwanted section but also higher discontinuity in the directional coupler. Unwanted coupling parts 405 and 406 also appear between the conductive lines of the directional coupler at their junctions with the coupled sections, so called "true part" of the coupler. All these unwanted couplings lead to a reduced directivity and a decreased performance of the directional coupler, as could be seen in FIG. 5.

FIG. 5 shows a simulated and measured performance of the double-section microstrip directional coupler, as the one shown in FIG. 3. The simulated performance is shown with continuous lines, the measured performance is shown with the dashed lines. It can be seen that at f>56.5 GHz, the isolation is less than the coupling, e.g., the directivity is negative.

Some techniques to mitigate non-ideality factors in multi-section directional couplers are currently known. Particularly, wiggly lines at coupled-line sections or lumped capacitors implemented across coupled lines.

FIG. 6 shows a directional coupler 600 where lines of a coupled-line section 601 are performed as wiggly lines. The wiggly line is a way to add semi-distributed capacitance along the coupled line section. Although the wiggly line couplers improve the directivity, use of wiggly lines alone is not possible for all applications due to lack of design equations for different applications. FIG. 7 shows a directional coupler 700 where lumped capacitors 706 and 707 are included across the coupled lines. Added lumped capacitors are used (or, in some cases, even needed) for a coupled-line section, particularly at non-TEM or quasi-TEM structures, where the even and odd mode velocities are not equal ($v_e \neq v_o$). Although introducing lumped capacitors increases directivity of the coupler, they cause parasitic effects at high frequencies, which does not improve the performance of the directional coupler at all applications.

The design equations for the directional couplers of FIGS. 6 and 7 may, for example, be described as $$\left\{\begin{array}{c} Z_{0e}=\sqrt{\dfrac{L+M}{C}} \\ Z_{0o}=\sqrt{\dfrac{L-M}{C+2\cdot C_M}} \\ v_e=\dfrac{c}{\sqrt{\varepsilon_{effe}}}=\dfrac{1}{\sqrt{(L+M)\cdot C}} \\ v_o=\dfrac{c}{\sqrt{\varepsilon_{effo}}}=\dfrac{1}{\sqrt{(L-M)\cdot(C+2\cdot C_M)}} \end{array}\right\} \Rightarrow \tag{4}$$

-continued $$\left\{\begin{array}{c} Z_{0e}^2 = \frac{L+M}{C} \\ Z_{0o}^2 = \frac{L-M}{C+2\cdot C_M} \\ \varepsilon_{effe} = (L+M)\cdot C\cdot c^2 \\ \varepsilon_{effo} = (L-M)\cdot(C+2\cdot C_M)\cdot c^2 \end{array}\right\} \Rightarrow$$

$$\Rightarrow \left\{\begin{array}{c} \varepsilon_{effe} = Z_{0e}^2\cdot C^2\cdot c^2 \\ \varepsilon_{effo} = Z_{0o}^2\cdot(C+2\cdot C_M)^2\cdot c^2 \end{array}\right\} \Rightarrow \frac{\varepsilon_{effe}}{\varepsilon_{effo}} = \sqrt{\frac{L+M}{L-M}\cdot\frac{C}{C+2\cdot C_M}} =$$

$$= \frac{Z_{0e}}{Z_{0o}}\cdot\frac{C}{C+2\cdot C_M}$$

$$\frac{\varepsilon_{effo}}{\varepsilon_{effe}}\cdot\frac{Z_{0e}}{Z_{0o}} - 1 = 2\cdot\frac{C_M}{C} \Rightarrow C_M = \frac{1}{2}\cdot\left(\frac{\varepsilon_{effo}}{\varepsilon_{effe}}\cdot\frac{Z_{0e}}{Z_{0o}} - 1\right)\cdot C$$

$$\frac{\varepsilon_{effo}}{\varepsilon_{effe}} < 1$$

$$1\cdot\frac{Z_{0e}}{Z_{0o}} - 1 = 2\cdot\frac{C_M + C_{ADDED}}{C} \Rightarrow C_{ADDED} =$$

$$\frac{1}{2}\cdot\left(\frac{Z_{0e}}{Z_{0o}} - 1\right)\cdot C - C_M = \frac{1}{2}\cdot\left(1 - \frac{\varepsilon_{effo}}{\varepsilon_{effe}}\right)\cdot\frac{Z_{0e}}{Z_{0o}}\cdot C$$

$$\left(\begin{array}{c} C_{ADDED} = \frac{1}{2}\cdot\left(1 - \frac{\varepsilon_{effo}}{\varepsilon_{effe}}\right)\cdot\frac{1}{Z_{0o}}\cdot\frac{\sqrt{\varepsilon_{effe}}}{c} \\ l = \frac{1}{4}\cdot\frac{c}{\sqrt{\varepsilon_{effe}}}\cdot\frac{1}{f_0} \end{array}\right) \Rightarrow C_{ADDED}\cdot l =$$

$$= \frac{1}{2}\cdot\left(1 - \frac{\varepsilon_{effo}}{\varepsilon_{effe}}\right)\cdot\frac{1}{Z_{0o}}\cdot\frac{\sqrt{\varepsilon_{effe}}}{c}\cdot\frac{1}{4}\cdot\frac{c}{\sqrt{\varepsilon_{effe}}}\cdot\frac{1}{f_0} = \frac{1}{8}\cdot\left(1 - \frac{\varepsilon_{effo}}{\varepsilon_{effe}}\right)\cdot\frac{1}{Z_{0o}}\cdot\frac{1}{f_0}$$

One more known solution to mitigate an unwanted coupling is insertion of shielding between the conductive lines of the directional coupler, where unwanted coupling happens. This solution is shown in FIG. 8. FIG. 8 shows a directional coupler 800, which comprises a first coupling section 801 characterized by parameters: a first electrical length $\theta_1=\pi/2$ and first even and odd mode impedances $Z_{0e1}$ and $Z_{0o1}$. The directional coupler comprises a second coupling section 802 characterized by parameters: a second electrical length $\theta_2=\pi/2$ and second even and odd mode impedances $Z_{0e2}$ and $Z_{0o2}$. Unwanted coupling appears between the conductive lines P1-P4 of the directional coupler at their junctions with the coupled sections 801 and 802, so called "true part" of the coupler. Shielding sections 803 and 804 are introduced in unwanted coupling parts (shown as red regions) to mitigate the unwanted coupling in these parts.

Although this solution shown in FIG. 8 increases the directivity of the directional coupler, it does not provide the directivity sufficient for all applications of the directional coupler, since it does not mitigate an unwanted coupling between the coupled lines of the second coupled section.

SUMMARY

In view of the above, there is a desire to obtain a coupler which provides for an improved tradeoff between coupler characteristics and implementation effort.

In view of the above, there is a desire to create a directional coupler concept with an improved performance of the coupler in different applications, which will overcome disadvantages of the known solutions.

For example, there is a desire to provide a good trade-off between a sufficient coupling in the wanted coupled section and decreasing parasitic coupling in other parts of the coupler and thus to provide an improved directivity of a signal transmission in the coupler.

Embodiments according to the disclosure, which may contribute to address the above mentioned desires, are defined by the pending independent claims.

Further advantageous aspects are the subject of the dependent claims.

The disclosure provides an improved directivity and corresponding performance of a multi-section directional coupler.

An embodiment according to the disclosure is directed to a multi-section directional coupler comprising a plurality of conductive lines, wherein each conductive line comprises a plurality of line sections. Also, the multi-section directional coupler comprises a plurality, e.g., a sequence, of coupled line sections, e.g., a first coupled line section with electrical length pi/2 and distance $s_1$ and impedances $Z_{0e1}$,$Z_{0o1}$ and a second coupled line section with electrical length pi/2 and distance $s_2$ and impedances $Z_{0e2}$,$Z_{0o2}$, having different coupling strength values. Each coupled line section comprises a first line section of a first conductive line and a second line section of a second conductive line. The coupled line sections facilitate signal coupling. The different coupling strength values may, for example, correspond to different odd mode impedances $Z_{0ox}$ and different even mode impedances $Z_{0ex}$, and may be caused by different line spacings $s_1$, $s_2$. The multi-section directional coupler comprises one or more grounded conductive coupling reduction structures, e.g., grounded metal outside of the less coupled section, arranged, e.g., selectively, adjacent to a selected coupled line section. Any metal may be, for example, used in an embodiment. The one or more grounded conductive coupling reduction structures are adapted to reduce a coupling value between a respective line section of the first conductive line and a respective line section of the second conductive line of the selected coupled line section, where the term "coupled lines" also refers to the respective line section of the first conductive line (or simply the first conductive line) and the respective line section of the second conductive line (or simply the second conductive line). The selected coupled line section comprises a smaller coupling strength value than another one of the coupled line sections.

This embodiment is based on the finding that grounded metal arranged adjacent to coupled line sections reduces a coupling for a given spacing between the coupled lines of the coupled line sections. Consequently the line spacing s2 decreases, while keeping the coupling factor constant. This leads to an increased directivity of the directional coupler. In other words, by using the grounded conductive coupling reduction structure, the line spacing s2 that is used to achieve a desired coupling is smaller than a conductive line spacing that would need to be used in the absence of the grounded conductive coupling reduction structure.

An unwanted parasitic coupling section between two sections with different coupling strength values can be avoided (or may reduced) in this embodiment (e.g., because changes in spacing can be kept smaller than in the absence of the grounded conductive coupling reduction structure), which may, for example, lead to a constant (or improved) global coupling factor of the directional coupler, an/or to an improved directivity and/or to an improved performance in different applications accordingly.

This concept can be implemented in different directional couplers, both symmetrical and asymmetrical, e.g., in microstrips (e.g in the couplers 100,110 described above).

For example, upon the reflection coefficient measurement, a presence of the grounded conductive coupling reduction structure (or a reduced coupling) in the less-coupled section may, for example, result in increased measurement accuracy due to mitigation of the directivity degradation. The directivity is the most significant parameter in most applications, particularly upon reflection coefficient measurement.

According to an embodiment, the multi-section directional coupler comprises two or more grounded conductive coupling reduction structures. By having two or more grounded conductive coupling reduction structures, which may, for example, be associated with (or adjacent to) the same section of coupled lines (e.g., on both sides of the section of coupled lines), or which may be associated with (or adjacent to) different sections of the coupled lines, characteristics may be further improved.

According to an embodiment, the selected coupled line section is arranged in between the two grounded conductive coupling reduction structures. Adding at least one grounded structure outside of each coupled line so that the selected coupled line section is arranged in between the grounded structures will provide the stable electrical field distribution in the selected coupled line section and a constant coupling factor.

According to an embodiment, at least one of the one or more grounded conductive coupling reduction structures is grounded on at least three locations distributed across a surface of the respective grounded conductive coupling reduction structure. Thus, the grounded conductive coupling reduction structure may, for example, act as a ground portion while avoiding (or significantly reducing) potential variations across the grounded conductive coupling reduction structure. Thus, undesirable frequency-variable effects can be kept reasonably small.

According to an embodiment, at least one of the one or more grounded conductive coupling reduction structures is grounded at two locations arranged at opposite ends of the respective grounded conductive coupling reduction structure. Thus, the grounded conductive coupling reduction structure may, for example, act as a ground portion while avoiding (or significantly reducing) potential variations across the grounded conductive coupling reduction structure. Thus, undesirable frequency-variable effects can be kept reasonably small.

According to an embodiment, via holes are formed in the one or more grounded conductive coupling reduction structures, to connect the one or more grounded conductive coupling reduction structures with a ground layer which is parallel to the one or more grounded conductive coupling reduction structures and to the coupled line sections. The ground layer may be, for example, made of any metal or any suitable grounded surface may be, for example, used as a ground layer in an embodiment. Thus, a good grounding of the grounded conductive coupling reduction structure may be achieved. Also, such an arrangement is well compatible with a stripline technology or a microstrip technology.

According to an embodiment, the via holes are grounded to provide grounding of the one or more grounded conductive coupling reduction structures. Thus, a good grounding of the grounded conductive coupling reduction structure may, be achieved. Also, such an arrangement is well compatible with a stripline technology or a microstrip technology.

According to an embodiment, the one or more grounded conductive coupling reduction structures are arranged outside of the selected coupled line section. By arranging the grounded conductive coupling reduction structures "outside" (e.g., beside) the selected coupled line section, the direct coupling path (or a field distribution within the direct coupling path) between the coupled line sections is not affected by the grounded conductive coupling reduction structures, while a coupling strength value is nevertheless reduced (e.g., by "pulling" a part of the field towards the grounded conductive coupling reduction structures). Thus, a structure of the field in an area right between the coupled line sections is not severely degraded (while a field strength is indeed reduced), and the grounded conductive coupling reduction structures handle a reduction of a distance between the coupled line sections.

According to an embodiment, the one or more grounded conductive coupling reduction structures are arranged to reduce an electric field strength in an area between the coupled lines of the selected coupled line section by at least 20%, or by at least 50%, or by at least 70% compared to a structure in which the one or more grounded conductive coupling reduction structures are not present. The reduced electric field strength between the coupled lines allows to reduce a distance between the coupled lines and helps to reduce a discontinuity in the coupled line section and also helps to increase the directivity of the coupled line section and of the directional coupler.

According to an embodiment, the one or more grounded conductive coupling reduction structures are spaced from the selected coupled line section. By avoiding a conductive connection between the coupled line sections and the one or more grounded conductive coupling reduction structures, a degradation of characteristics of the coupler by the grounded conductive coupling reduction structures can be avoided.

According to an embodiment, a spacing between the one or more grounded conductive coupling reduction structures and the selected coupled line section is less than a distance between the coupled lines of the selected coupled line section. Using such a configuration, a coupling between the coupled line sections can be effectively reduced, resulting in improved characteristics, e.g., structure characteristics, of the directional coupler.

According to an embodiment, the spacing between the one or more grounded conductive coupling reduction structures and the selected coupled line section is less than a width of a coupled line of the selected coupled line section. It has been found that such a configuration results in particularly good characteristics, e.g., structure characteristics, of the directional coupler, and helps to confine a field in a limited spatial area.

According to an embodiment, the spacing between the one or more grounded conductive coupling reduction structures and the selected coupled line section is less than a width of the one or more grounded conductive coupling reduction structures. By using such a configuration, a field can be well-confined, and a leakage of the field beyond the grounded conductive coupling reduction structures is kept small.

According to an embodiment, the one or more grounded conductive coupling reduction structures are electrically isolated from the selected coupled line section. It has been found that a degradation of a coupler characteristics can be avoided using such a construction.

According to an embodiment, the one or more grounded conductive coupling reduction structures have a polygonal shape, e.g., regular or e.g., irregular polygonal shape. It has been found that a polygonal shape of the one or more grounded conductive coupling reduction structures helps to facilitate a design, since polygonal shapes can typically be meshed with good accuracy in simulation tools. Moreover, a particularly good characteristic can be reached, for example, if one of the edges of the polygonal shape is parallel to the coupled line section.

According to an embodiment, the one or more grounded conductive coupling reduction structures have a rectangular shape, e.g., a square shape. It has been found that such a shape allows for a particularly efficient design. This is particularly true if one of the edges of the grounded conductive coupling reduction structure is parallel to the coupled line section.

According to an embodiment, the one or more grounded conductive coupling reduction structures have a two-dimensional curved shape. It has been found that a curved shape may help to reduce discontinuities and also a concentration of an electrical field at corners.

According to an embodiment, the one or more grounded conductive coupling reduction structures have an oval shape, e.g., a shape of a circle. It has been found that such a shape may help to reduce discontinuities and therefore brings along a good characteristic, e.g., structure characteristics, of the directional coupler.

According to an embodiment, the one or more grounded conductive coupling reduction structures have an extension of more than a half of a length of the selected coupled line section.

It has been found that a significant improvement of the characteristics, e.g., structure characteristics, of the directional coupler can be achieved by using a sufficient extension of the one or more grounded conductive coupling reduction structures. Also it has been found that a homogeneity of the electrical field is typically relatively good if the one or more grounded conductive coupling reduction structures have an extension of more than a half of a length of the selected coupled line section, while smaller extensions tend to cause some degradation of the coupler characteristics.

According to an embodiment, the one or more grounded conductive coupling reduction structures have an extension from 80% to 100% of the length of the selected coupled line section. It has been found that such an extension of the one or more grounded conductive coupling reduction structures is particularly advantageous, as such an extension allows the grounded conductive coupling reduction structures to reduce a coupling value between the coupled lines substantially along the full length of the selected coupled line section. Thus, the field distribution between the line sections of the selected coupled line section is structurally similar to the field distribution which would be present in the absence of the coupled line sections. Thus, conventional coupler design rules remain applicable, except for the fact that a coupling strength value is reduced (for a given distance of the coupled line sections).

According to an embodiment, the one or more grounded conductive coupling reduction structures extend along a full length of the selected coupled line section. Using such a configuration, a maximum effect of the grounded conductive coupling reduction structures can be achieved, and discontinuities of the structure along the selected coupled line section are avoided.

According to an embodiment, the one or more grounded conductive coupling reduction structures are arranged outside of an area adjacent to one or more of the coupled line sections having a coupling strength value higher than the coupling strength value of the selected coupled line section. Accordingly, an impact of the grounded conductive coupling reduction structures onto other coupled line sections, except for the selected coupled line section, can be reduced. By selectively reducing a coupling strength value of a selected coupled line section, while leaving a coupling strength value of an adjacent (stronger-coupled) coupled line section unaffected, a change of the gap between the coupled line sections from one coupled line section to another coupled line section can be kept small, which helps to reduce a discontinuity and therefore contributes to an improvement of coupler characteristics.

According to an embodiment, the distance between the coupled lines of the selected coupled line section is at least 50% less than the distance between the coupled lines of the selected coupled line section in the structure in which the one or more grounded conductive coupling reduction structures are not present. Thus, the one or more grounded conductive coupling reduction structures are arranged such that they allow for a significant reduction of the gap (distance) between coupled lines of the selected coupled line section, which in turn typically brings along a reduction of artifacts and helps to improve an overall coupler characteristic.

According to an embodiment, a difference between a distance between center lines of the coupled lines of the selected coupled line section and a distance between center lines of coupled lines of the one or more of the coupled line sections having a coupling strength value higher than the coupling strength value of the selected coupled line section is a maximum 50% of the width of the coupled lines (e.g., the first conductive line or the second conductive line) of the selected coupled line section. Using such a configuration, a detrimental influence of discontinuities onto coupler characteristics can be kept reasonably small. Moreover, it should be noted that such small discontinuities between adjacent coupled line sections are possible due to the presence of the grounded conductive coupling reduction structures.

According to an embodiment, one or more additional coupling reduction shielding sections are formed between conductive lines of the multi-section directional coupler. The additional coupling reduction shielding sections are formed, e.g., as metalization, e.g., grounded, e.g., with vias. The additional coupling reduction shielding section mitigates, e.g., reduces, an unwanted coupling between conductive lines of the directional coupler at their junctions with the coupled line sections, thus increasing the directivity of the directional coupler. Combination of the grounded conductive coupling reduction structures and additional coupling reduction shielding sections provides elimination of unwanted coupling both between the coupled line sections and between the conductive lines of the directional coupler. This minimizes the degradation factors, thus considerably improving the performance of the directional coupler.

According to an embodiment, via holes are formed in the one or more additional coupling reduction shielding sections, to connect the one or more additional coupling reduction shielding sections with the ground layer which is parallel to the one or more grounded conductive coupling reduction structures, to the one or more additional coupling reduction shielding sections and to the coupled line sections. The ground layer may be, for example, made of any metal or any suitable grounded surface may be, for example, used as a ground layer in an embodiment. Thus, it is possible to tie the additional coupling reduction shielding sections to a ground potential in an efficient manner, thereby obtaining a good shielding and keeping an area small.

According to an embodiment, the via holes are grounded to provide grounding of the one or more additional coupling reduction shielding sections.

According to an embodiment, the one or more additional coupling reduction shielding sections are spaced from the conductive lines of the multi-section directional coupler.

Accordingly, a distortion of the input signals and of the output signals of the coupler can be reduced or even avoided.

According to an embodiment, a spacing between the one or more additional coupling reduction shielding sections and the conductive lines is less than the distance between the coupled lines of the selected coupled line section. By having a close proximity between the additional coupling reduction shielding sections and the conductive lines, an extension of the field can be limited, and a parasitic coupling between different conductive lines can be suppressed.

According to an embodiment, the spacing between the one or more additional coupling reduction shielding sections and the conductive lines is less than a width of the conductive lines (e.g., the first conductive line or the second conductive line). Thus, an extension of the electric field can be limited and parasitic coupling can be strongly reduced.

According to an embodiment, the spacing between the one or more additional coupling reduction shielding sections and the conductive lines is equal to the spacing between the one or more grounded conductive coupling reduction structures and the selected coupled line section. Such a design helps to reduce discontinuities and therefore contributes to good coupler characteristics.

According to an embodiment, the one or more additional coupling reduction shielding sections are electrically isolated from the conductive lines. Accordingly, a signal degradation is avoided and losses are kept small.

According to an embodiment, the one or more additional coupling reduction shielding sections are arranged outside of the area adjacent to the one or more of the coupled line sections having a coupling strength value higher than the coupling strength value of the selected coupled line section. Thus, a degradation of the desired coupling between the strongly-coupled line sections is avoided.

According to an embodiment, a wiggly line coupling is used in the one or more of the coupled line sections having a coupling strength value higher than the coupling strength value of the selected coupled line section. The wiggly line may have different profile, e.g., triangular, e.g., rectangular, e.g., sinusoidal, e.g., fractal. Due to added semi-distributed capacitance along the coupled line section, which is due to the wiggly line coupling, in combination with grounded conductive coupling reduction structures outside of the coupled line sections and/or additional coupling reduction shielding sections between conductive lines of the multi-section directional coupler, an improved directivity of the directional coupler up to 70% is achieved.

According to an embodiment, the multi-section directional coupler is a parallel-line coupler. It has been found that the usage of the grounded conductive coupling reduction structures is well-suited for such a coupler type.

According to an embodiment, the parallel-line coupler has a TEM structure. It has been found that the usage of the grounded conductive coupling reduction structures is well-suited for such a coupler type. For example, the grounded conductive coupling reduction structures are very well compatible with a stripline structure that may be used to implement a TEM structure.

According to an embodiment, the parallel-line coupler has a non-TEM structure or a quasi-TEM structure. It has been found that the usage of the grounded conductive coupling reduction structures is also well-suited for such a coupler type. For example, the grounded conductive coupling reduction structures are very well compatible with a micro-stripline structure that may be used to implement a quasi-TEM structure.

According to an embodiment, the parallel-line coupler is a microstrip directional coupler, or a stripline directional coupler, a TEM coupler, or a quasi-TEM coupler. It has been found that the grounded conductive coupling reduction structures are very well compatible with such types of couplers.

An embodiment according to the disclosure is directed to a method of manufacturing a multi-section directional coupler, the method comprising: forming a plurality of conductive lines on a substrate, wherein each conductive line comprises a plurality of line sections, wherein the forming the plurality of conductive lines comprises: forming a plurality of coupled line sections on the substrate, wherein each coupled line section comprises a first line section of a first conductive line and a second line section of a second conductive line, wherein the coupled line sections comprise different coupling strength values, wherein the coupled line sections facilitate signal coupling; and forming at least one grounded conductive coupling reduction structure adjacent to a selected coupled line section on the substrate, wherein the selected coupled line section comprises a smaller coupling strength value than another one of the coupled line sections, wherein the at least one grounded conductive coupling reduction structure is operable to reduce a coupling value between a respective line section of the first conductive line and a respective line section of the second conductive line of the selected coupled line section.

The method according to this embodiment is based on the same considerations as a multi-section directional coupler described above. Moreover, this disclosed embodiment may optionally be supplemented by any other features, functionalities and details disclosed herein in connection with the multi-section directional coupler, both individually and taken in combination.

An embodiment according to the disclosure is directed to a method of operating a multi-section directional coupler, the method comprising: providing the multi-section directional comprising a plurality of conductive lines and a plurality of coupled line sections, wherein each conductive line comprises a plurality of line sections, wherein each coupled line section comprises a first line section of a first conductive line and a second line section of a second conductive line, wherein the coupled line sections comprise different coupling strength values, wherein the coupled line sections facilitate signal coupling; and reducing a coupling value between a respective line section of the first conductive line and a respective line section of the second conductive line of a selected coupled line section by arranging at least one grounded conductive coupling reduction structure adjacent to the selected coupled line section which comprises a smaller coupling strength value than another one of the coupled line sections.

The method according to this embodiment is based on the same considerations as a multi-section directional coupler described above. Moreover, this disclosed embodiment may optionally be supplemented by any other features, functionalities and details disclosed herein in connection with the multi-section directional coupler, both individually and taken in combination.

An embodiment according to the disclosure is directed to a computer program having a program code for performing, when running on a computer, the methods according to any of embodiments described above.

The multi-section directional coupler, the method for manufacturing the multi-section directional coupler and the method for operating the multi-section directional coupler and the computer program for implementing these methods may optionally be supplemented by any of the features, functionalities and details disclosed herein (in the entire document), both individually and taken in combination.

This summary is provided to introduce a selection of principles of the disclosure in a simplified form that are further described below in the Detailed Description section. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments, together with the description, serve to explain the principles of the disclosure.

Embodiments of the present disclosure are set out below in the figures.

FIG. 2B shows a table, illustrating an in-band ripple of conventional directional couplers with different number of sections;

DETAILED DESCRIPTION

Reference will now be made in detail to embodiments, examples of which are illustrated in the accompanying drawings. While the disclosure will be described in conjunction with these embodiments, it should be understood that they are not intended to limit the disclosure to these embodiments. On the contrary, the disclosure is intended to cover alternatives, modifications, and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

It should be noted that any of the features, functionalities and details of the couplers 100, 110 may optionally be used in any of the embodiments of the disclosure, both individually and taken in combination.

It should be noted that, optionally, one or more wiggly lines may be used in embodiments according to the disclosure.

It should be noted that, optionally, one or more lumped capacitors may be used in embodiments according to the disclosure.

Figure 6:
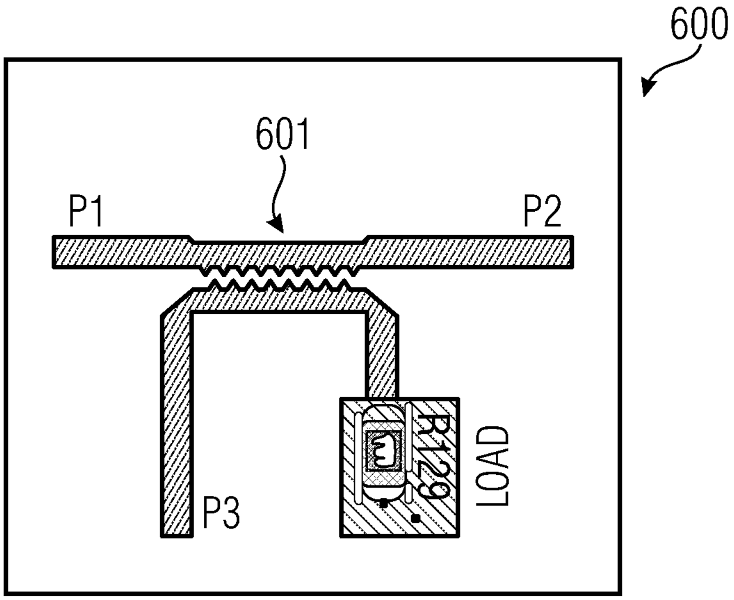
FIG. 6 shows a top view of a conventional directional coupler.
Figure 7:
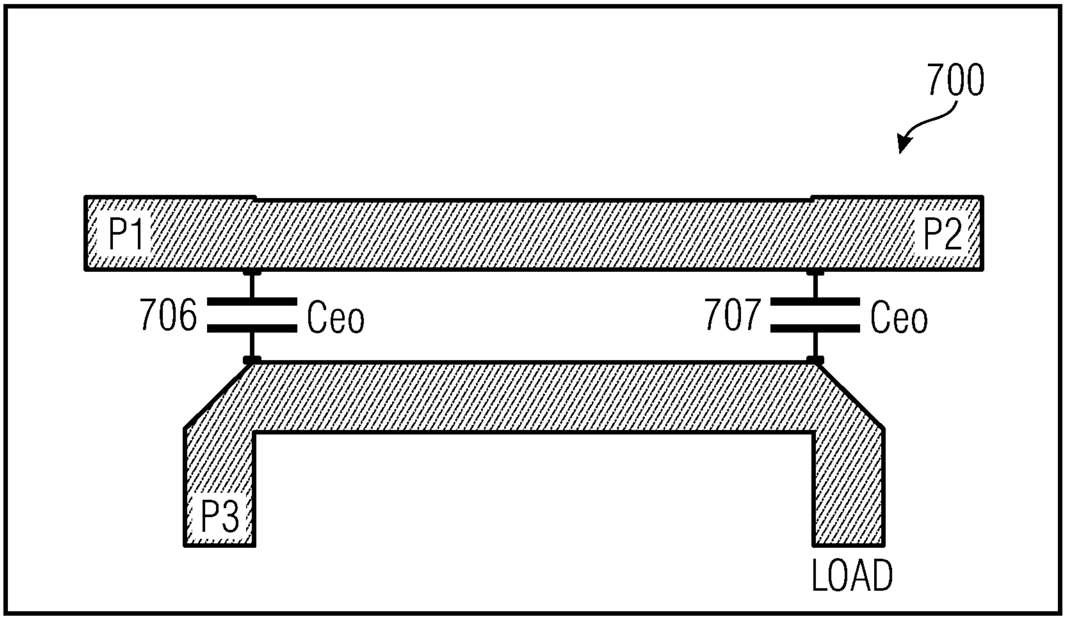
FIG. 7 shows a schematic representation of a conventional directional coupler.

The design equations for the directional couplers of FIGS. 6 and 7 may optionally be used in embodiments according to the disclosure.

Figure 9:
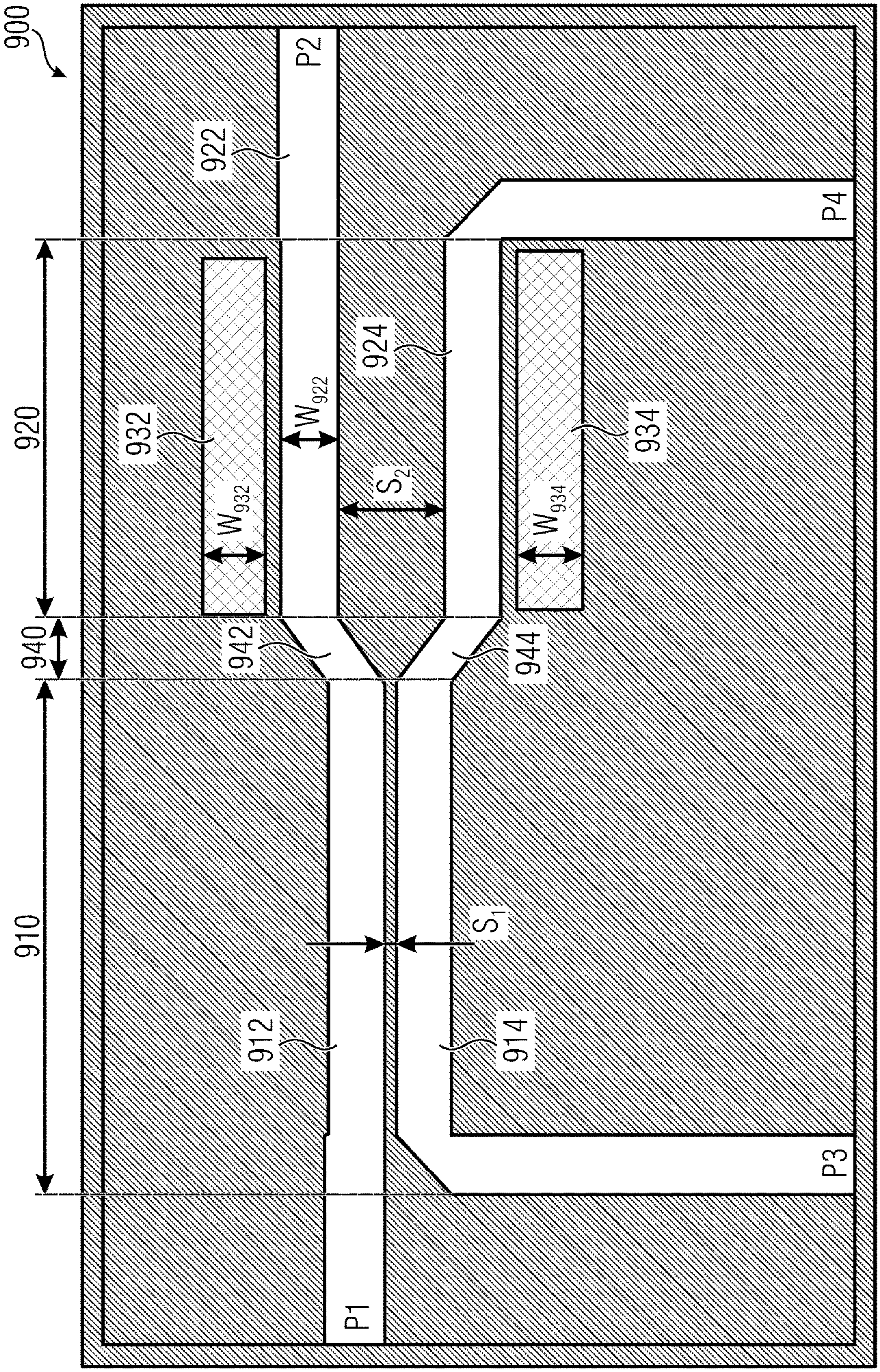
FIG. 9 shows a schematic representation (top view) of a directional coupler in accordance with an embodiment.

FIG. 9 shows a schematic representation (top view) of a directional coupler 900 in accordance with an embodiment.

The directional coupler 900 comprises two coupled line sections, namely a first coupled line section 910 and a second coupled line section 920 having different coupling strength values defined (at least partly) by different spacing between coupled lines (e.g., conductive line P1-P2 and conductive line P3-P4).

The first coupled line section 910 comprises a first conductor (or conductor portion or line section) 912 and a second conductor (or conductor portion or line section) 914. The first conductor 912 and the second conductor 914 may be parallel and comprise uniform line widths.

For example, the line widths of the first conductor 912 and of the second conductor 914 may be equal. The first conductor 912 and the second conductor 914 comprise a spacing $s_1$.

The second coupled line section 920 comprises a third conductor (or conductor portion or line section) 922 and a fourth conductor (or conductor portion or line section) 924. The third conductor 922 and the fourth conductor 924 may be parallel and comprise uniform line widths.

For example, the line widths of the third conductor 922 and of the fourth conductor 924 may be equal. The third conductor 922 and the fourth conductor 924 comprise a spacing $s_2$.

For example, line widths of the first conductor 912, of the second conductor 914, of the third conductor 922, and of the fourth conductor 924 may all be equal.

Between the first coupled line section 910 and the second coupled line section 920, there is a transition section 940, in which the first conductor 912 is connected with the third conductor 922 using a first transition conductor 942, and in which the second conductor 914 is connected with the fourth conductor 924 using a second transition conductor 944. Along the transition section, a conductor spacing increases from $s_1$ to $s_2$. The transition section 940 is substantially shorter than the first coupled line section 910 and the second coupled line section 920, e.g., shorter than a fourth of the length of the first coupled line section 910 and/or of the length of the second coupled line section 920, or even shorter than a sixth of the length of the first coupled line section 910 and/or of the length of the second coupled line section 920, or even shorter than a tenth of the length of the first coupled line section 910 and/or of the length of the second coupled line section 920.

It should be noted that the transition section 940 helps to keep reflections at a transition between the first coupled line section 910 and the second coupled line section 920 reasonable small by providing a smooth transition between line spacings $s_1$ and $s_2$ (e.g., with a steadily increasing spacing between the transition conductors 942, 944). However, it should also be noted that the transition section 940, due to its length, has a degrading impact on the coupler characteristics. Accordingly, there is on the one hand, a desire to keep the transition section as short as possible, and on the other hand there is also a desire to have a sufficiently smooth transition between the first spacing $s_1$ and the second spacing $s_2$.

As mentioned before, the two coupled line sections of the directional coupler 900 have different spacing $s_1$ and $s_2$ between coupled lines of the coupled line sections 910 and 920 respectively. The spacing $s_1$ of the first coupled line section 910 is smaller, e.g., at least three times smaller, or at least five times smaller, or at least eight times smaller, than the spacing $s_2$ of the second coupled line section 920. That is, the second coupled line section 920 is a less-coupled section (or a less strongly coupled section) of the two coupled line sections, e.g., the second coupled line section 920 comprises a smaller coupling strength value than the first coupled line section 910.

The coupled line sections are, for example, characterized by electrical lengths $\theta_1$ and $\theta_2$ and by an even mode impedance $Z_{0e1\text{-}2}$ and an odd mode impedance $Z_{0O1\text{-}2}$.

For example, for all the line sections of the coupler k=1 . . . 2, the following correspondences are correct (e.g., within a tolerance of +/−5%, or +/−10% or +/−15%).

The line sections are, for example, impedance-matched (e.g., within a tolerance of +/−5%, or +/−10% or +/−15%):

$$\sqrt{Z_{0ek}\cdot Z_{0ok}}=R_0; \quad (5)$$

where $R_0$ is a reference impedance.

The line sections have, for example the same electrical length equal to 90° at the center frequency $f_0$ (e.g., within a tolerance of +/−5%, or +/−10% or +/−15%):

$$\theta_k = \frac{\pi}{2}. \quad (6)$$

The line sections have, for example, a specific coupling factor C (e.g., within a tolerance of +/−5%, or +/−10% or +/−15%):

$$C_k = \frac{Z_{0ek} - Z_{0ok}}{Z_{0ek} + Z_{0ok}} = \frac{\frac{Z_{0ek}}{Z_{0ok}} - 1}{\frac{Z_{0ek}}{Z_{0ok}} + 1} = \frac{\left(\frac{Z_{0ek}}{R_0}\right)^2 - 1}{\left(\frac{Z_{0ek}}{R_0}\right)^2 + 1} \quad (7)$$

The directional coupler 900 further comprises two grounded conductive coupling reduction structures 932, 934. The grounded conductive coupling reduction structures 932, 934 are, for example, made from a grounded metal. Any metal may be used in an embodiment. The grounded conductive coupling reduction structures 932, 934 are arranged adjacent to the second coupled line section (or selected coupled line section) 920. The grounded conductive coupling reduction structures 932, 934 are arranged adjacent to the coupled lines, e.g., third conductor (or line section) 922 and fourth conductor (or line section) 924, of the second coupled line section 920. The grounded conductive coupling reduction structures 932, 934 are arranged outside of the second coupled line section 920, so that the second coupled line section 920 (or, more precisely, the third conductor 922 and the fourth conductor 924) is arranged in between the two grounded conductive coupling reduction structures 932, 934. The grounded conductive coupling reduction structures 932, 934 are electrically isolated from the second coupled line section 920.

For example, the first grounded conductive coupling reduction structure 932 is arranged besides (e.g., substantially parallel to) the third conductor 922, e.g., with a gap in between. For example, the gap between third conductor 922 and the first grounded coupling reduction structure 932 may comprise a uniform width. Also, an extension of the first grounded coupling reduction structure in a direction parallel to a main extension of the third conductor 922 may be approximately equal to the main extension of the third conductor 922. For example, the extension of the first grounded coupling reduction structure 932 in the direction parallel to the main extension of the third conductor 922 may be between 80% and 110% of the main extension of the third conductor 922. For example, the coupling reduction structure may not be present in a region along the transition conductor 942, and may also not be present along a feed structure that that connects the coupled line section 920 with further circuitry. Moreover, a width (e.g., an extension in a direction perpendicular to the main extension of the third conductor 922) of the first grounded coupling reduction structure may, for example, be similar to a width $w_{922}$ of the third conductor 922. For example, the width $w_{932}$ of the first grounded coupling reduction structure may be between 60% and 150% of the width $w_{922}$ of the third conductor 922.

Moreover, corresponding (or identical) conditions may also apply for the second grounded coupling reduction structure 934 (e.g., with respect to the fourth conductor 924 and with respect to the transition conductor 944).

For example, in an embodiment, the width $w_{922}$ of the third conductor 922 (and also the width of the fourth conductor 924) may be smaller than the spacing $s_2$ between the third conductor 922 and the fourth conductor 924. Similarly, the width $w_{932}$ of the first grounded coupling reduction structure may, for example, be smaller than the spacing $s_2$. Similarly, the width $w_{934}$ of the second grounded coupling reduction structure may, for example, be smaller than the spacing $s_2$.

Also, it should be noted that an area between the third conductor 922 and the fourth conductor 924 may, for example, be free from any conductive structures.

The grounded conductive coupling reduction structures 932, 934 reduce the coupling for the spacing $s_2$. Worded differently, the spacing $s_2$ decreases due to the arrangement of the grounded conductive coupling reduction structures 932, 934, while keeping the coupling factor between the coupled lines of the second coupled line section 920 constant.

Worded yet differently, the spacing $s_2$ which results in a desired coupling (which may, for example, be defined by design rules of the directional coupler) is reduced. Accordingly, the spacing $s_2$ can, for example, be reduced when compared to an alternative design in which there are no grounded conductive coupling reduction structures 932, 934. Worded yet differently, the grounded conductive coupling reduction structures compensate an increase in the coupling, which would normally (in the absence of the grounded conductive coupling reduction structures) be caused by a reduction of the spacing.

For example, the grounded conductive coupling reduction structures 932, 934 are (e.g., respectively) spaced from the (respective) coupled lines 922, 924 of the second coupled line section 920 at a distance $d_1$, which is, for example, less than a width of the coupled lines 922, 924 of the coupled line section 920. The distance $d_1$ is, for example, less than the spacing $s_2$ between the coupled lines 922, 924 of the coupled line section 920. The distance $d_1$ is, for example (but not necessarily), approximately the same, as the spacing $s_1$ between the coupled lines of the first coupled line section 910.

The grounded conductive coupling reduction structures 932, 934 have, for example, a rectangular shape and extend for more than a half of a length of the second coupled line section 920. The grounded conductive coupling reduction structures 932, 934 may, however, have any other suitable shape, as described herein, e.g., a circle shape, a polygonal (regular or irregular) shape, an oval shape, a shape of a circle, a shape of a flower, or two-dimensional curved shapes. The grounded conductive coupling reduction structures 932, 934 may, for example, extend for the whole length of the portion of the second coupled line section 920, at which the coupled lines 922, 924 of the second coupled line section 920 are arranged parallel to each other.

The grounded conductive coupling reduction structures 932, 934 are, for example, arranged outside of an area adjacent to the first coupled line section 910.

Any of the two grounded conductive coupling reduction structures 932, 934 may, for example, be grounded at two locations arranged at opposite ends of the respective grounded conductive coupling reduction structure or on at least three locations distributed across a surface of the respective grounded conductive coupling reduction structure 932, 934.

It should also be noted that the coupled line section 920 may overall comprise a symmetric topology, e.g., symmetric with respect to a center line between the third conductor 922 and the fourth conductor 924.

The directional coupler 900 is shown as having two coupled line sections. However, the directional coupler 900 may have, for example, multiple coupled line sections, for example three or four or more, in an embodiment. For example, some (e.g., one or more) of the sections of the multiple coupled line sections may be formed as the first coupled line section 910 or as the second coupled line section 910 (or may comprise the fundamental structure of the first coupled line section or of the second coupled line section). For example, a more complex coupler may, for example, comprise one or more coupled line sections, which comprise the topology of the coupled line section 920, and may also comprise two or more coupled line sections which comprise the topology of the second coupled line section 920.

In an embodiment, the directional coupler 900 may, for example, have more than two grounded conductive coupling reduction structures 932, 934, which may be arranged, for example, "outside" of (e.g., besides) selected coupled line section with a smaller coupling strength value.

Figure 1A:
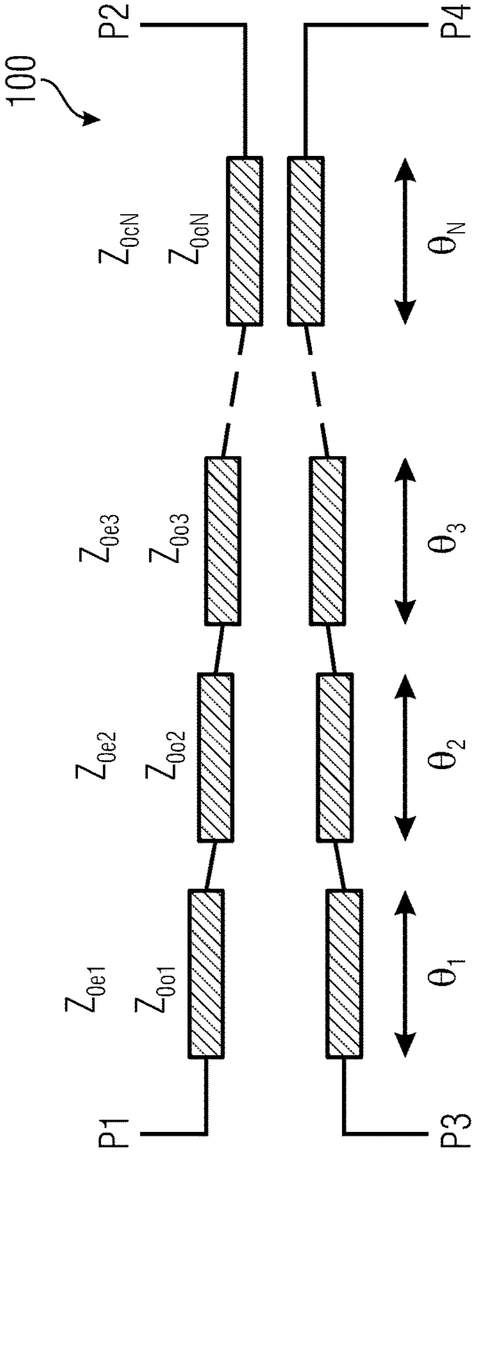
FIG. 1A shows a schematic representation of a conventional asymmetrical directional coupler.
Figure 1B:
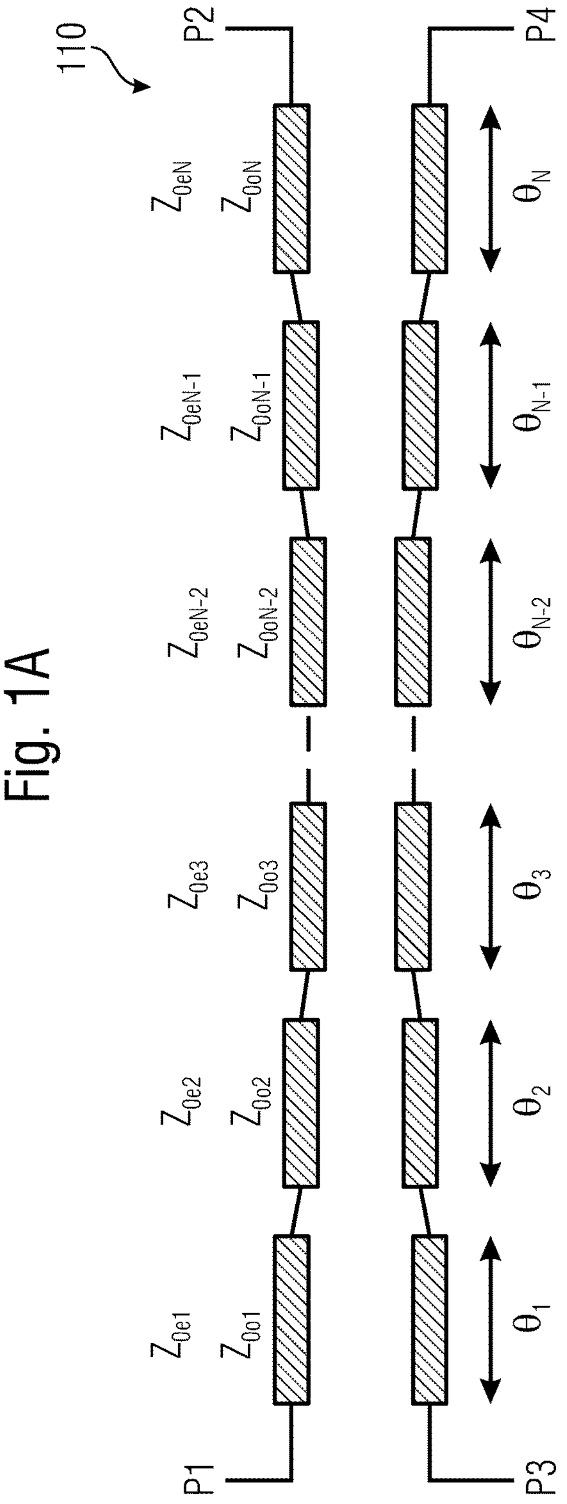
FIG. 1B shows a schematic representation of a conventional symmetrical directional coupler.
Figure 2A:
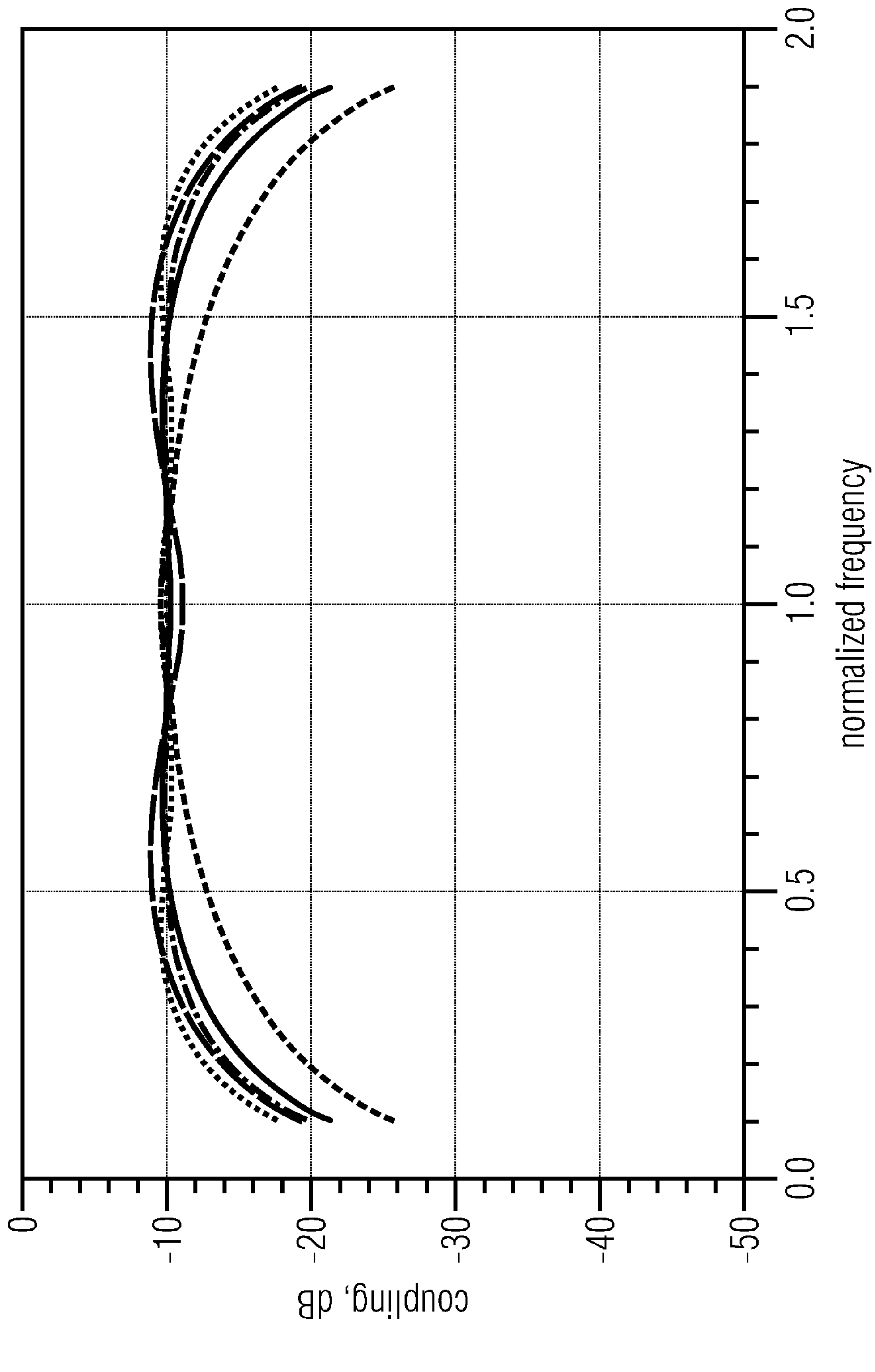
FIG. 2A shows graphical representations of examples of possible coupling curves of conventional directional couplers with different number of sections.
Figure 3:
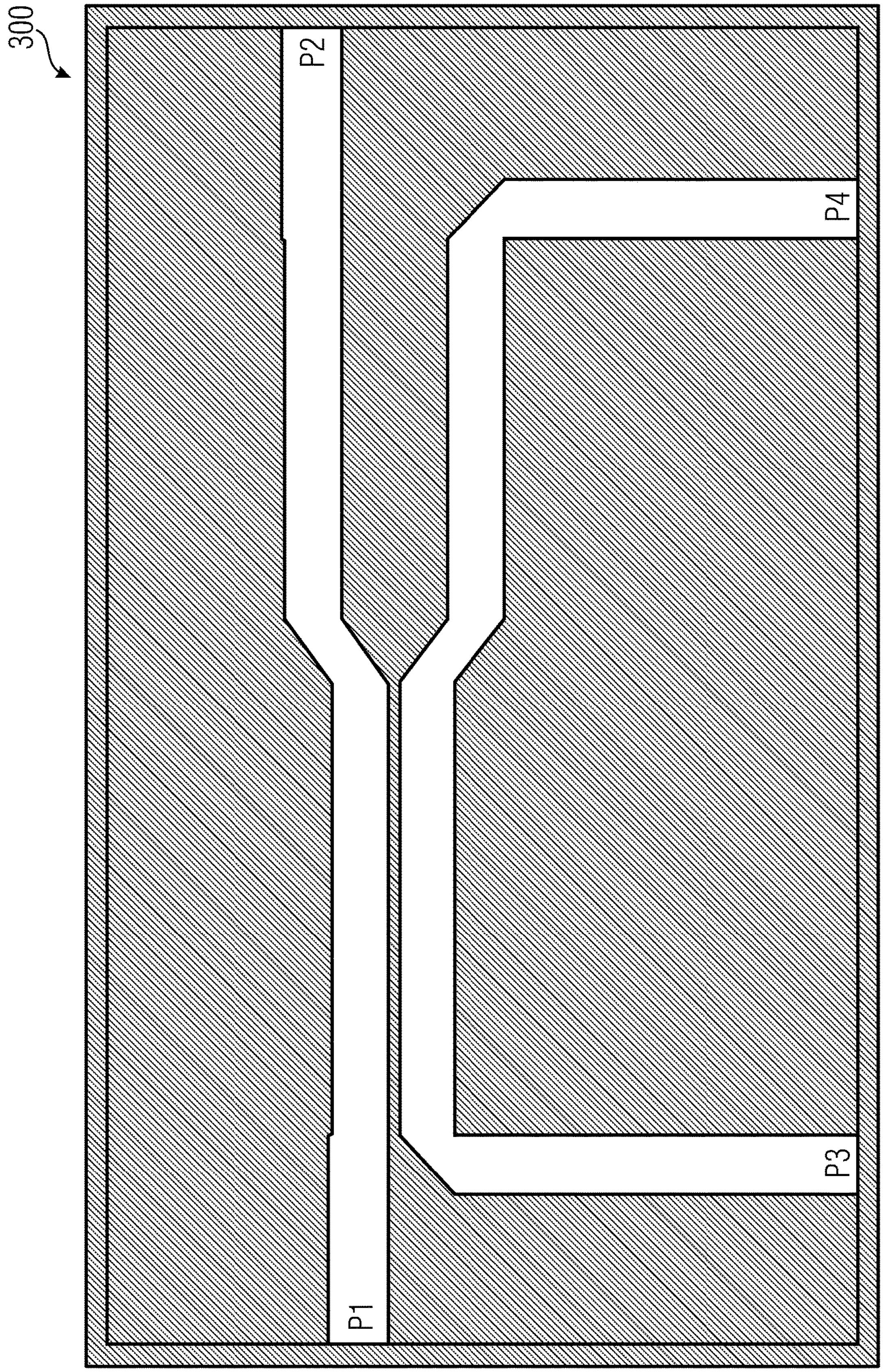
FIG. 3 shows a top view of a conventional directional coupler.
Figure 4:
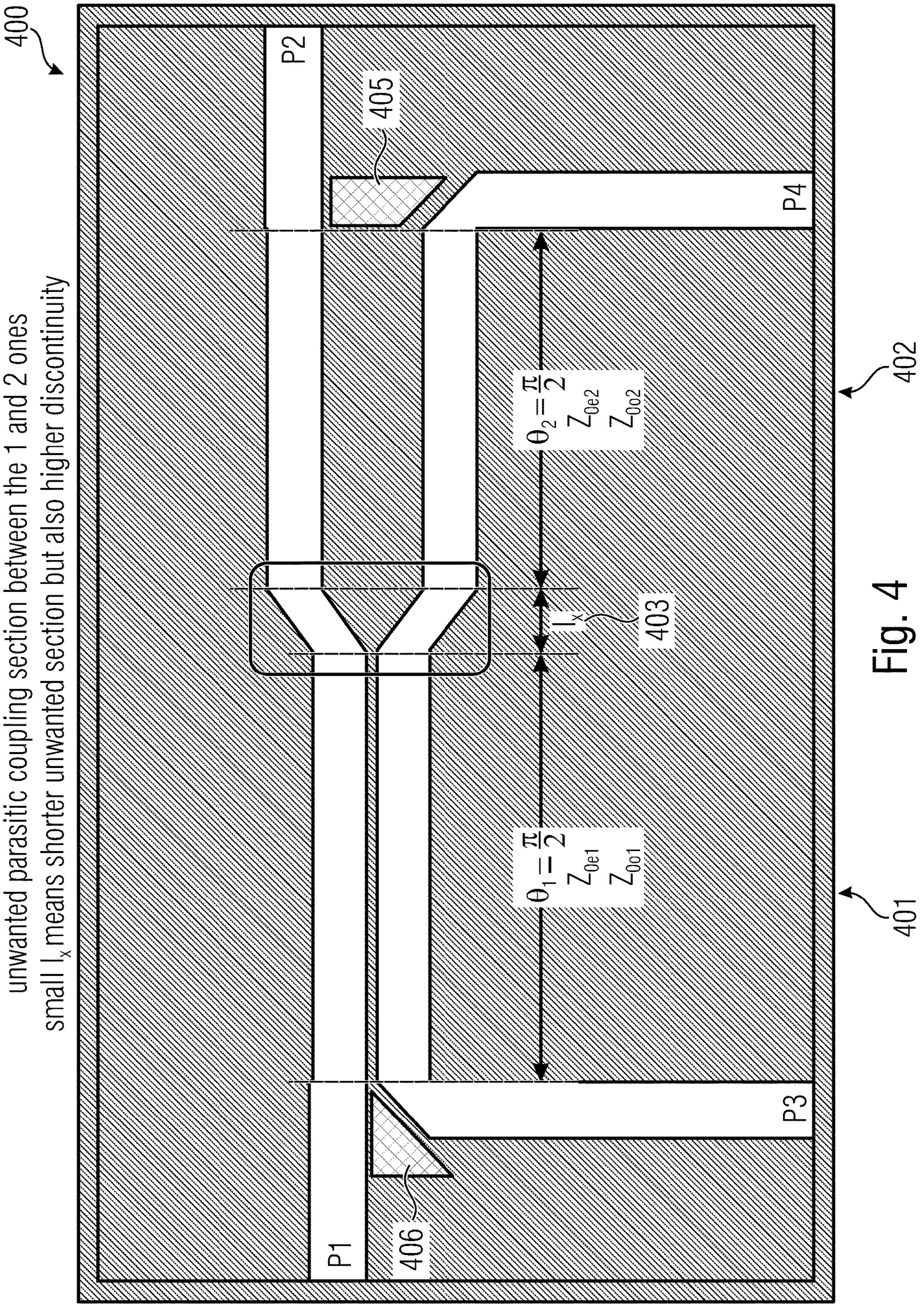
FIG. 4 shows an illustration of degradation factors of a conventional directional coupler.
Figure 8:
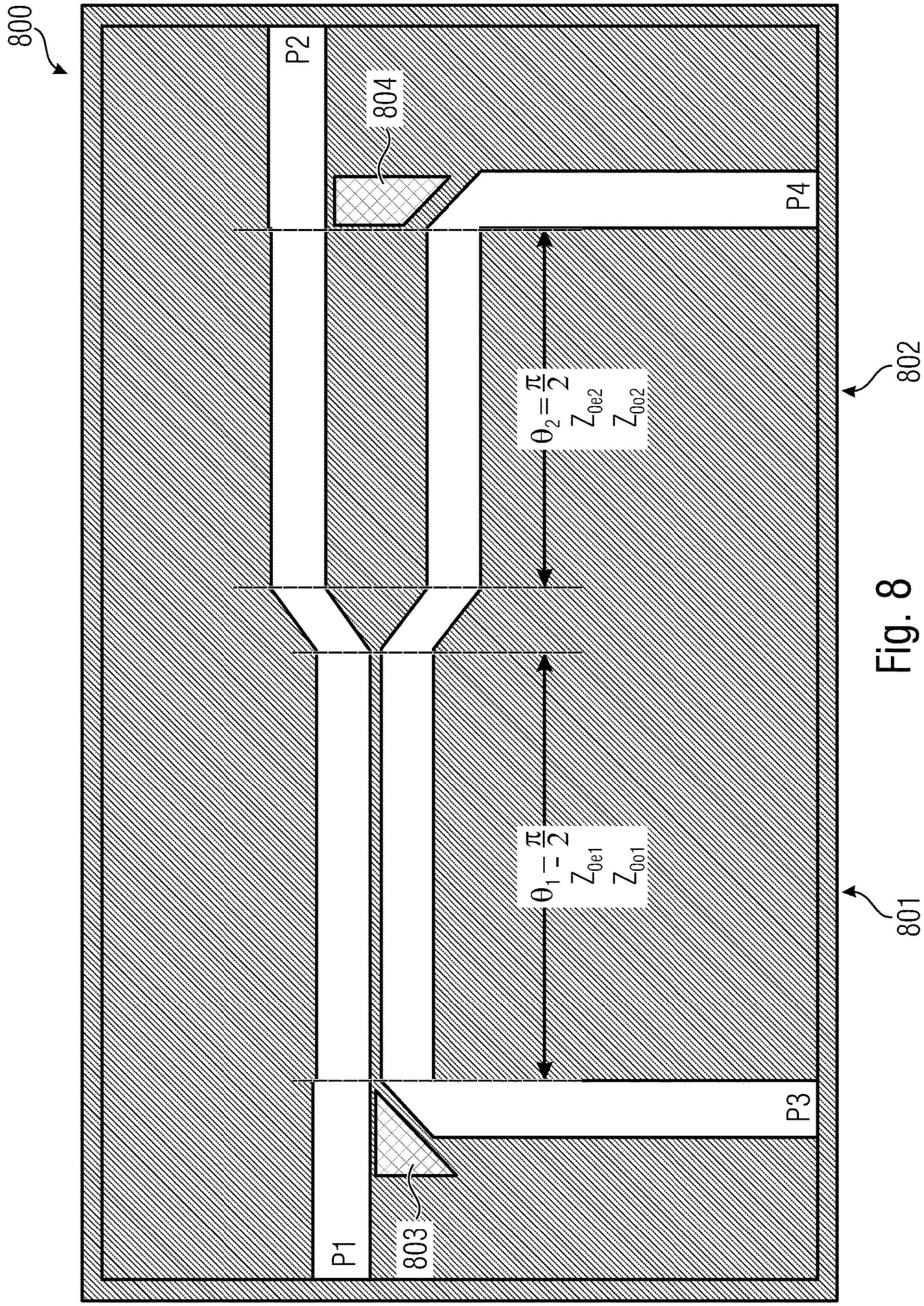
FIG. 8 shows a schematic representation (top view) of a conventional directional coupler.

The design of the directional coupler 900 (e.g., the second coupled line section 920) may be used, for example, in the asymmetrical coupler shown in FIG. 1A, or in the symmetrical coupler shown in FIG. 1B, or in any of the conventional couplers shown in any of FIG. 3, 4, or 8.

The design of the directional coupler 900 provides, for example, mitigation of the degradation factors of the conventional directional coupler, for example those degradation factors shown in and described in relation to FIG. 4.

The design of the directional coupler 900 provides an improvement of the performance of the directional coupler 900 due to an increased directivity in comparison with the conventional double-section directional coupler, which is shown in FIGS. 3 and 4.

However, it should be noted that the directional coupler 900 may optionally be supplemented by any of the features, functionalities and details disclosed herein, both individually or taken in combination.

Figure 10:
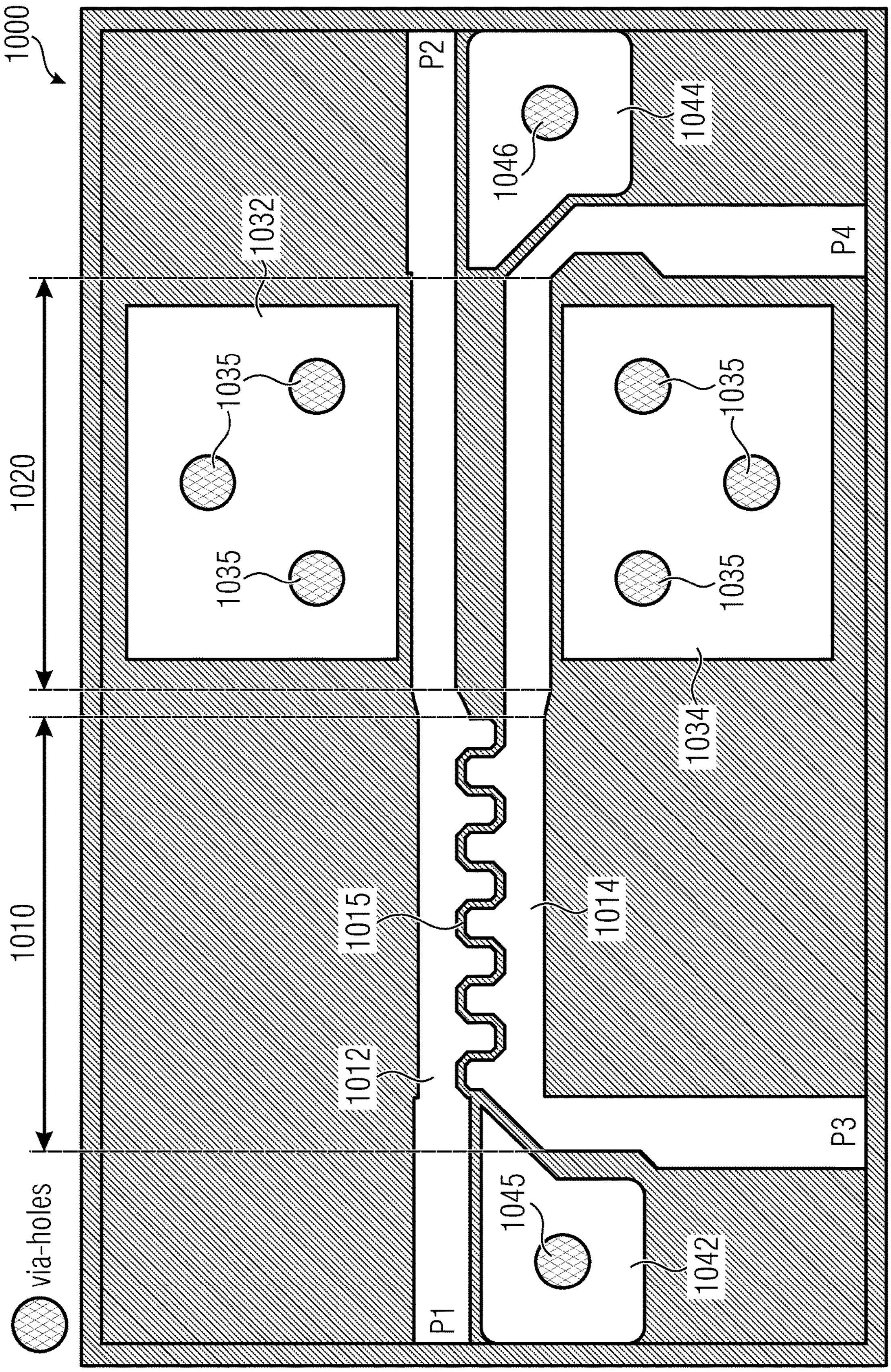
FIG. 10 shows a schematic representation (top view) of a directional coupler in accordance with an embodiment.

FIG. 10 shows a directional coupler 1000 in accordance with an embodiment.

The directional coupler 1000 comprises two coupled line sections, namely a first coupled line section 1010 and a second coupled line section 1020 having different coupling strength values defined by different spacing between coupled lines. The spacing of the first coupled line section 1010 is smaller, e.g., at least 3 times smaller, or at least 5 times smaller, or at least eight times smaller, than the spacing of the second coupled line section 1020. That is, the second coupled line section 1020 is a less-coupled (or less strongly coupled, or weaker coupled) section of the two coupled line sections, e.g., the second coupled line section 1020 comprises a smaller coupling strength value than the first coupled line section 1010.

For example, the first coupled line section 1010 may correspond to the first coupled line section 910, and the second coupled line section 1020 may correspond to the second coupled line section 920.

The size of the directional coupler 1000 may be, for example, 2.4×1.4 mm.

The first coupled line section 1010 has a wiggly line coupling, e.g., a wiggly line 1015 between its coupled lines. In other words, a separation (or gap) between a first conductor 1012 (or conductor portion) and a second conductor 1014 (or conductor portion) may comprise a wiggly shape. In other words, a surface or part of the first conductor 1012 (or conductor portion) close to the second conductor 1014 is formed as a wiggly line while a surface or part of the second conductor 1014 (or conductor portion) close to the first conductor 1012 is formed as a wiggly line, therefore, a wiggly shape of the separation (or the gap) between the first and the second conductors is formed. In other words, the first conductor 1012 (or conductor portion) comprises projections, e.g., of the same form and size, extending in the direction to the second conductor 1014, e.g., downward from the first conductor 1012 (or conductor portion), along the length of the first conductor 1012 (or conductor portion), and the second conductor 1014 (or conductor portion) comprises projections, e.g., of the same form and size, extending in the direction to the first conductor 1012, e.g., upward from the second conductor 1014. The wiggly line 1015 has a substantially rectangular profile, e.g., a profile of rectangulars, e.g., squares, with rounded corners. In other words, the projections of the first conductor 1012 and the projections of the second conductor 1014 have a substantially rectangular shape, e.g., of rectangles, e.g., of squares, e.g., with rounded corners. The projections of the first conductor 1012 correspond to the cutouts of the second conductor 1014 formed between the projections of the second conductor 1014. The projections of the second conductor 1014 correspond to the cutouts of the first conductor 1012 formed between the projections of the first conductor 1012. The wiggly line may, however, have any other suitable profile or shape, e.g., triangular, e.g sinusoidal, e.g., fractal. The wiggly line adds semi-distributed capacitance along the coupled line section.

The wiggly line coupling, e.g., a triangular wiggly line, shown in FIG. 6 can be introduced in the directional coupler 1000 in an embodiment.

The conventional equations (4) considering added semi-distributed capacitance along the coupled line section with the wiggly line coupling can be, for example, used upon calculating design equations for the directional coupler 1000 with the wiggly line coupling in the first coupled line section 1010.

The directional coupler 1000 further comprises two grounded conductive coupling reduction structures 1032, 1034. The grounded conductive coupling reduction structures 1032, 1034 are made from (or comprise) a grounded metal. Any metal may be used in an embodiment. The grounded conductive coupling reduction structures 1032, 1034 are arranged adjacent (e.g., on outer sides) to the second coupled line section 1020. The grounded conductive coupling reduction structures 1032, 1034 are arranged adjacent to the coupled lines of the second coupled line section 1020. The grounded conductive coupling reduction structures 1032, 1034 are arranged outside of the second coupled line section 1020, so that the second coupled line section 1020 is arranged in between the two grounded conductive coupling reduction structures 1032, 1034. The grounded conductive coupling reduction structures 1032, 1034 are electrically isolated (e.g., galvanically separated) from the second coupled line section 1020 (or from the conductors or conductor portions of the second coupled line section).

The grounded conductive coupling reduction structures 1032, 1034 reduce the coupling (e.g., for the spacing) of the second coupled line section 1020. The spacing of the second coupled line section 1020 decreases due to the arrangement of the grounded conductive coupling reduction structures 1032, 1034, while keeping the coupling factor between the coupled lines of the second coupled line section 1020 constant. In other words, due to the presence of the grounded conductive coupling reduction structures, the spacing between the conductors (or conductor portions) of the second coupled line section 1020 can be chosen smaller (e.g., for a desired coupling) when compared to a structure in which the grounded conductive coupling reduction structures are not present. Accordingly, a discontinuity between the first coupled line section and the second coupled line section can be reduced, which in turn results in an improved directional coupler characteristic.

The grounded conductive coupling reduction structures 1032, 1034 are, for example, spaced from the coupled lines (or, more precisely, from the respective one of the coupled lines) of the coupled line section 1020 at a distance, which is less than a width of the (respective) coupled line of the coupled line section 1020. The distance between the grounded conductive coupling reduction structures 1032, 1034 and the coupled lines (or, more precisely, the respective one of the coupled lines) of the coupled line section 1020 is, for example, less than the spacing between the coupled lines of the coupled line section 1020 and, for example, approximately the same, as the spacing between the coupled lines of the first coupled line section 1010.

The grounded conductive coupling reduction structures 1032, 1034 have, for example, a rectangular shape and extend, for example, for more than a half of a length of the second coupled line section 1020. The grounded conductive coupling reduction structures 1033, 1034 may, however, have any other suitable shape, as described herein, e.g., a polygonal (regular or irregular) shape, an oval shape, a shape of a circle, a shape of a flower, or two-dimensional curved shapes. The grounded conductive coupling reduction structures 1032, 1034 extend, for example, for the whole length of the portion of the second coupled line section 1020, at which the coupled lines of the second coupled line section 1020 are arranged parallel to each other.

The grounded conductive coupling reduction structures 1032, 1034 are, for example, arranged outside of an area adjacent to the first coupled line section 1010.

Each of the grounded conductive coupling reduction structures 1032, 1034 is, for example, grounded at three locations distributed across a surface of the respective grounded conductive coupling reduction structure 1032, 1034. Via holes 1035 are formed in (or at) these three locations to connect the grounded conductive coupling reduction structures 1032, 1034 with a ground layer (not shown), which is, for example, parallel to the grounded conductive coupling reduction structures 1032, 1034 and to the coupled line sections 1010 and 1020 (e.g., to form microstrip structures or stripline structures). Thus, grounding of the grounded conductive coupling reduction structures 1032, 1034 is provided. The ground layer may be, for example, made of any metal or any suitable grounded surface may be, for example, used as a ground layer in an embodiment.

The directional coupler 1000 is shown as having two coupled line sections. However, the directional coupler 1000 may have, for example, multiple coupled line sections, for example three or four or more, in an embodiment. Some of the sections of the multiple coupled line sections may be formed as the first coupled line section 1010 or as the second coupler line section 1010. In other words, for example, at least one section may comprise the topology of the first coupled line section 1010, and two or more sections may comprise the topology of the second coupled line section 1020.

In an embodiment, the directional coupler 1000 may, for example, have more than two grounded conductive coupling reduction structures 1032, 1034, which may be arranged, for example, outside of the selected coupled line section with a smaller coupling strength value.

The directional coupler 1000 comprises, for example, two additional coupling reduction shielding sections 1042, 1044, which are formed between conductive lines of the directional coupler. One of the additional coupling reduction shielding sections, namely a first coupling reduction shielding section 1042, is formed between conductive lines P1 and P3, another of the additional coupling reduction shielding sections, namely a second coupling reduction shielding section 1044, is formed between conductive lines P2 and P4.

The additional coupling reduction shielding sections 1042, 1044 are electrically isolated from the conductive lines P1-P4. The additional coupling reduction shielding sections 1042, 1044 are arranged outside of the area adjacent to the first coupled line section 1010. The additional coupling reduction shielding sections 1042, 1044 are arranged outside of the area adjacent to the second coupled line section 1020. Rather the first coupling reduction shielding section 1042 may, for example, be arranged between the feed lines P1, P3 connected to the first coupled line section in a wedge-like manner, to thereby reduce a parasitic coupling between the feed lines P1, P3. Moreover, the second coupling reduction shielding section 1044 may, for example, be arranged between the feed lines P2, P4 connected to the second coupled line section in a wedge-like manner, to thereby reduce a parasitic coupling between the feed lines P2, P4.

The additional coupling reduction shielding sections 1042, 1044 have, for example, a generally rectangular shape, e.g., a square shape, and comprise triangular-shaped projections, which are formed to (exactly) fit between conductive lines P1 and P3 (coupling reduction shielding sections 1042) and conductive lines P2 and P4 (coupling reduction shielding sections 1044) accordingly. The additional coupling reduction shielding sections 1042, 1044 are spaced from the conductive lines P1-P4. A spacing between the additional coupling reduction shielding sections 1042, 1044 and the respective conductive lines P1-P4 is, for example, less than the spacing between the coupled lines of the coupled line section 1020. The spacing between the additional coupling reduction shielding sections 1042, 1044 and the conductive lines P1-P4 is, for example, approximately the same, as the spacing between the coupled lines of the first coupled line section 1010. The spacing between the additional coupling reduction shielding sections 1042, 1044 and the conductive lines P1-P4 is, for example, equal to the distance between the grounded conductive coupling reduction structures 1030 and the coupled lines of the coupled line section 1020. The spacing between the additional coupling reduction shielding sections 1042, 1044 and the conductive lines P1-P4 is, for example, less than a width of the conductive lines P1-P4.

One side of the additional coupling reduction shielding sections 1042, 1044 extends, for example along a respective one of the conductive lines P1 and P2, e.g., parallel to the respective one of the conductive lines P1 and P2, accordingly. One other side of the additional coupling reduction shielding sections 1042, 1044 repeats a shape of a respective one of the conductive lines P3 and P4 accordingly. For example, a conductive line P1 may extend in a direction parallel to a center axis of the coupler, e.g., in a direction parallel to a main extension of the coupled line sections. In other words, the conductive line P1 may, for example, constitute a straight extension of a first conductor of the coupled line section 1010. Moreover, the conductive line P3 may extend in a direction perpendicular to the center axis of the coupler, with a mitered 90-degrees bend between a second conductor of the coupled line section 1010 and the conductive line P3.

A first portion (or edge) of the first coupling reduction shielding section 1042 extends along the conductive line P1. Another portion (or edge) of the first coupling reduction shielding section 1042 extends along the miter of the bend (e.g., in parallel to the miter), and the first coupling reduction shielding section 1042 continues along the conductive line P3 (e.g., with an edge that is parallel to a portion of the conductive line P3). Moreover, a width of the conductive line P3 may increase in proximity of a position where the first coupling reduction shielding section 1042 ends. For example, the increase in width of the conductive line P3 may, for example, at least partially compensate a reduction of a capacitance loading of the conductive line, which is caused by the proximity of the first coupling reduction shielding section.

Similar considerations also apply for the second coupling reduction shielding section.

The additional coupling reduction shielding sections 1042, 1044 have, for example, the size smaller than the grounded conductive coupling reduction structures 1032, 1034, e.g., four times smaller.

The additional coupling reduction shielding sections 1042, 1044 are, for example, made of grounded metal. Any metal may be used in an embodiment. Each of the additional coupling reduction shielding sections 1042, 1044 is grounded, for example, at one point in a central part of the respective additional coupling reduction shielding section 1042, 1044. The additional coupling reduction shielding sections 1042, 1044 comprise one respective via hole 1045, 1046 in each of the additional coupling reduction shielding sections 1042, 1044. For example, via holes 1045, 1046 are formed at locations in the central part of the respective additional coupling reduction shielding sections to connect the respective additional coupling reduction shielding sections 1042, 1044 with the ground layer (not shown), which is, for example, parallel to the grounded conductive coupling reduction structures 1032, 1034, the additional coupling reduction shielding sections 1042, 1044 and to the coupled line sections 1010 and 1020. Thus, grounding of the respective additional coupling reduction shielding sections 1042, 1044 is provided. The ground layer may be, for example, made of any metal or any suitable grounded surface may be, for example, used as a ground layer in an embodiment.

Shielding sections used in the directional coupler 800 shown in FIG. 8 may optionally be introduced in the directional coupler 1000 as additional coupling reduction shielding sections 1042, 1044 in an embodiment.

The directional coupler 1000 has a design, which allows to achieve a directivity improvement of about 10 dB (e.g., when compared to some conventional solutions).

The design of the directional coupler 1000 may optionally be introduced in the directional coupler 900 shown in FIG. 9.

The design of the directional coupler 1000 may be used, for example, in the asymmetrical coupler shown in FIG. 1A, or in the symmetrical coupler shown in FIG. 1B, or in any of the conventional couplers shown in any of FIG. 3, 4, or 8.

However, it should be noted that the directional coupler 900 may optionally be supplemented by any of the features, functionalities and details disclosed herein, both individually or taken in combination.

Figure 5:
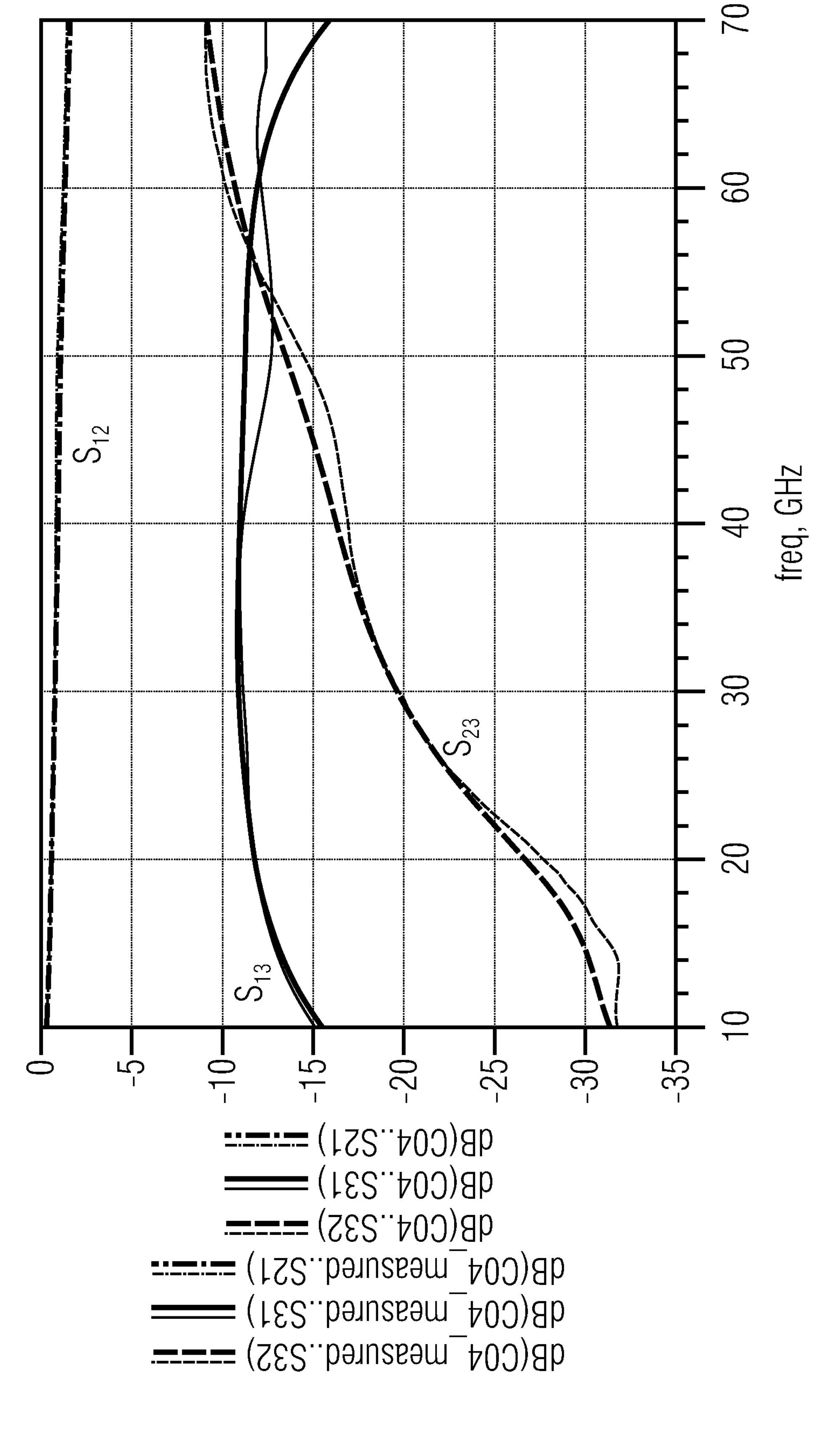
FIG. 5 shows a graphical representation of a simulated and measured performance of a conventional directional coupler.
Figure 11:
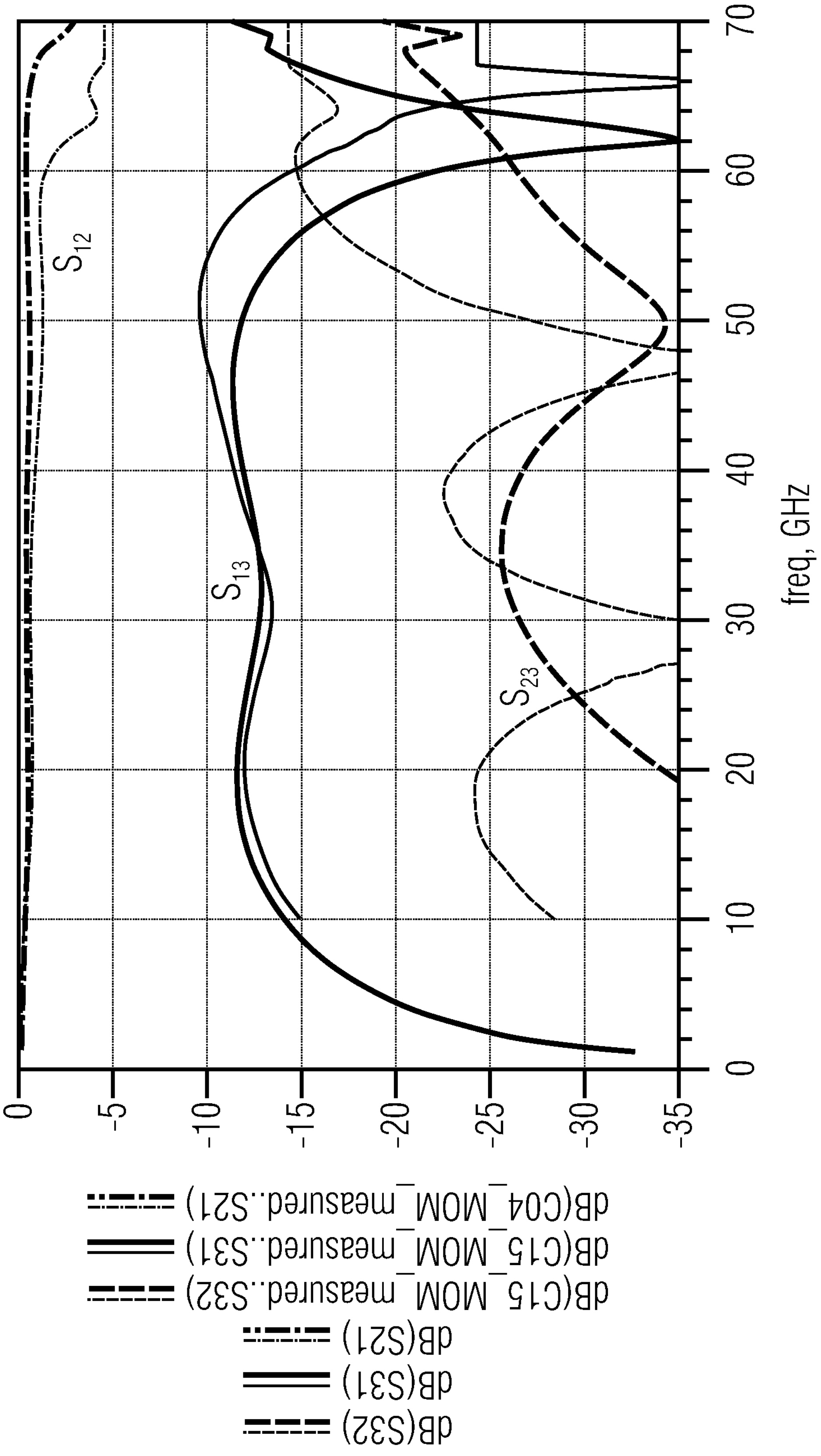
FIG. 11 shows a graphic representation of a simulated and measured performance of a directional coupler in accordance with an embodiment.

FIG. 11 shows a simulated and measured performance of the directional coupler 1000, shown in FIG. 10. The simulated performance is shown with continuous lines, the measured performance is shown with the dashed lines. In comparison with the simulated and measured performance shown in FIG. 5 of the conventional double-section directional coupler, which is shown in FIGS. 3 and 4, a directivity improvement of about 10 dB is provided. FIG. 11 shows an improvement of the performance of the directional coupler 1000 of about 50% due to an increased directivity in comparison with the conventional double-section directional coupler, which is shown in FIGS. 3 and 4.

To conclude, embodiments of the disclosure provide an improved tradeoff between a sufficient coupling in the wanted coupled section and decreasing parasitic coupling in other parts of the coupler and thus providing an improved directivity of a signal transmission in the coupler.

In the following, further aspects and embodiments according to the disclosure will be described, which can be used individually or in combination with any other embodiments disclosed herein.

Moreover, the embodiments disclosed in this section may optionally be supplemented by any other features, functionalities and details disclosed herein, both individually and taken in combination.

Moreover, it should be noted that the embodiments and procedures may be used as described in this section, and may optionally be supplemented by any of the features, functionalities and details disclosed herein (in this entire document), both individually and taken in combination.

However, the features, functionalities and details described in any other chapters can also, optionally, be introduced into the embodiments according to the present disclosure, both individually and taken in combination.

Also, the embodiments described in the above mentioned chapters can be used individually, and can also be supplemented by any of the features, functionalities and details in another chapter.

Also, it should be noted that individual aspects described herein can be used individually or in combination. Thus, details can be added to each of said individual aspects without adding details to another one of said aspects.

In particular, embodiments are also described in the claims. The embodiments described in the claims can optionally be supplemented by any of the features, functionalities and details as described herein, both individually and in combination.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software.

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the disclosure can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the disclosure comprise a data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The herein described embodiments are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A multi-section directional coupler comprising:

a plurality of conductive lines, wherein each conductive line comprises a plurality of line sections;

a plurality of coupled line sections, wherein each coupled line section comprises a first line section of a first conductive line and a second line section of a second conductive line, wherein the coupled line sections comprise different coupling strength values, wherein the coupled line sections facilitate signal coupling; and at least one grounded conductive coupling reduction structure arranged adjacent to a selected coupled line section;

wherein the at least one grounded conductive coupling reduction structure is operable to reduce a coupling value between a respective line section of the first conductive line and a respective line section of the second conductive line of the selected coupled line section;

wherein the selected coupled line section comprises a smaller coupling strength value than another one of the coupled line sections; and wherein the at least one grounded conductive coupling reduction structure includes a shape selected from the group consisting of a polygonal shape comprising at least three sides, a rectangular shape, a two-dimensional curved shape, an oval shape, and a shape extending more than a half of a length of the selected coupled line section.

2. The multi-section directional coupler of claim 1, wherein the at least one grounded conductive coupling reduction structure comprises two or more grounded conductive coupling reduction structures.

3. The multi-section directional coupler of claim 2, wherein the selected coupled line section is arranged in between a first grounded conductive coupling reduction structure and a second grounded conductive coupling reduction structure.

4. The multi-section directional coupler of claim 1, wherein a respective one of the at least one grounded conductive coupling reduction structure is grounded on at least three locations distributed across a surface of the respective one of the at least one grounded conductive coupling reduction structure.

5. The multi-section directional coupler of claim 1, wherein a respective one of the at least one grounded conductive coupling reduction structure is grounded at two locations arranged at opposite ends of the respective one of the at least one grounded conductive coupling reduction structure.

6. The multi-section directional coupler of claim 1, further comprising a ground layer arranged parallel to the at least one grounded conductive coupling reduction structure and to the coupled line sections, and wherein the at least one grounded conductive coupling reduction structure comprises a plurality of via holes operable to connect the at least one grounded conductive coupling reduction structure with the ground layer.

7. The multi-section directional coupler of claim 6, wherein the via holes are grounded to provide grounding of the at least one grounded conductive coupling reduction structure.

8. The multi-section directional coupler of claim 1, wherein the at least one grounded conductive coupling reduction structure is arranged outside relative to the selected coupled line section.

9. The multi-section directional coupler of claim 1, wherein the at least one grounded conductive coupling reduction structure is arranged to reduce an electric field strength value in an area between the respective line section of the first conductive line and the respective line section of the second conductive line of the selected coupled line section by one of at least 20%, at least 50%, or at least 70% compared to a structure in which the at least one grounded conductive coupling reduction structure is not present.

10. The multi-section directional coupler of claim 1, wherein the at least one grounded conductive coupling reduction structure is spaced from the selected coupled line section.

11. The multi-section directional coupler of claim 10, wherein a spacing between the at least one grounded conductive coupling reduction structure and the selected coupled line section is less than a distance between the respective line section of the first conductive line and the respective line section of the second conductive line of the selected coupled line section.

12. The multi-section directional coupler of claim 11, wherein the spacing between the at least one grounded conductive coupling reduction structure and the selected coupled line section is less than a width of the first conductive line or the second conductive line of the selected coupled line section.

13. The multi-section directional coupler of claim 11, wherein the spacing between the at least one grounded conductive coupling reduction structure and the selected coupled line section is less than a width of the at least one grounded conductive coupling reduction structure.

14. The multi-section directional coupler of claim 1, wherein the at least one grounded conductive coupling reduction structure is electrically isolated from the selected coupled line section.

15. The multi-section directional coupler of claim 1, wherein the at least one grounded conductive coupling reduction structure comprises an extension from 80% to 100% of the length of the selected coupled line section.

16. The multi-section directional coupler of claim 1, wherein the at least one grounded conductive coupling reduction structure extends along a full length of the selected coupled line section.

17. The multi-section directional coupler of claim 1, wherein the at least one grounded conductive coupling reduction structure is arranged outside of an area adjacent to the another one of the coupled line sections comprising a coupling strength value higher than the coupling strength value of the selected coupled line section.

18. The multi-section directional coupler of claim 1, wherein a distance between the first conductive line and the second conductive line of the selected coupled line section is at least 50% less than the distance between the first conductive line and the second conductive line of the selected coupled line section in a structure in which the at least one grounded conductive coupling reduction structure is not present.

19. The multi-section directional coupler of claim 1, wherein a difference between a distance between center lines of the first conductive line and the second conductive line of the selected coupled line section and a distance between center lines of the first conductive line and the second conductive line of the another one of the coupled line sections comprising a coupling strength value higher than the coupling strength value of the selected coupled line section is a maximum 50% of a width of the first conductive line or the second conductive line of the selected coupled line section.

20. The multi-section directional coupler of claim 1, further comprising one or more additional coupling reduction shielding sections positioned between the conductive lines.

21. The multi-section directional coupler of claim 20, further comprising a ground layer parallel to the at least one grounded conductive coupling reduction structure, to the one or more additional coupling reduction shielding sections, and to the coupled line sections, wherein the one or more additional coupling reduction shielding sections comprise via holes operable to connect the one or more additional coupling reduction shielding sections with the ground layer.

22. The multi-section directional coupler of claim 21, wherein the via holes are grounded to provide grounding of the one or more additional coupling reduction shielding sections.

23. The multi-section directional coupler of claim 20, wherein the one or more additional coupling reduction shielding sections are spaced from the conductive lines.

24. The multi-section directional coupler of claim 23, wherein a spacing between the one or more additional coupling reduction shielding sections and the conductive lines is less than a distance between the first conductive line and the second conductive line of the selected coupled line section.

25. The multi-section directional coupler of claim 23, wherein a spacing between the one or more additional coupling reduction shielding sections and the conductive lines is less than a width of the first conductive line or the second conductive line.

26. The multi-section directional coupler of claim 23, wherein a spacing between the one or more additional coupling reduction shielding sections and the conductive lines is equal to a distance between the at least one grounded conductive coupling reduction structure and the selected coupled line section.

27. The multi-section directional coupler of claim 20, wherein the one or more additional coupling reduction shielding sections are electrically isolated from the conductive lines.

28. The multi-section directional coupler of claim 20, wherein the one or more additional coupling reduction shielding sections are arranged outside another one of the coupled line sections comprising a coupling strength value higher than the coupling strength value of the selected coupled line section.

29. The multi-section directional coupler of claim 1, further comprising a wiggly line coupling positioned in the another one of the coupled line sections comprising a coupling strength value higher than the coupling strength value of the selected coupled line section.

30. The multi-section directional coupler of claim 1, wherein the multi-section directional coupler comprises a parallel-line coupler.

31. The multi-section directional coupler of claim 30, wherein the parallel-line coupler comprises a TEM structure.

32. The multi-section directional coupler of claim 30, wherein the parallel-line coupler comprises one of a non-TEM structure or quasi-TEM structure.

33. The multi-section directional coupler of claim 30, wherein the parallel-line coupler comprises one of a microstrip directional coupler, a stripline directional coupler, a TEM coupler, or a quasi-TEM coupler.

34. A method of manufacturing a multi-section directional coupler, the method comprising:

forming a plurality of conductive lines on a substrate, wherein each conductive line comprises a plurality of line sections, wherein the forming the plurality of conductive lines comprises:

forming a plurality of coupled line sections on the substrate, wherein each coupled line section comprises a first line section of a first conductive line and a second line section of a second conductive line, wherein the coupled line sections comprise different coupling strength values, wherein the coupled line sections facilitate signal coupling; and forming at least one grounded conductive coupling reduction structure adjacent to a selected coupled line section on the substrate, wherein the selected coupled line section comprises a smaller coupling strength value than another one of the coupled line sections, wherein the at least one grounded conductive coupling reduction structure is operable to reduce a coupling value between a respective line section of the first conductive line and a respective line section of the second conductive line of the selected coupled line section, and wherein the at least one grounded conductive coupling reduction structure includes a shape selected from the group consisting of a polygonal shape comprising at least three sides, a rectangular shape, a two-dimensional curved shape, an oval shape, and a shape extending more than a half of a length of the selected coupled line section.

35. A method of operating a multi-section directional coupler, the method comprising:

providing the multi-section directional coupler comprising a plurality of conductive lines and a plurality of coupled line sections, wherein each conductive line comprises a plurality of line sections, wherein each coupled line section comprises a first line section of a first conductive line and a second line section of a second conductive line, wherein the coupled line sections comprise different coupling strength values, wherein the coupled line sections facilitate signal coupling; and reducing a coupling value between a respective line section of the first conductive line and a respective line section of the second conductive line of a selected coupled line section by arranging at least one grounded conductive coupling reduction structure adjacent to the selected coupled line section which comprises a smaller coupling strength value than another one of the coupled line sections;

wherein the at least one grounded conductive coupling reduction structure includes a shape selected from the group consisting of a polygonal shape comprising at least three sides, a rectangular shape, a two-dimensional curved shape, an oval shape, and a shape extending more than a half of a length of the selected coupled line section.

* * * * *